(12) United States Patent
Izumi et al.

(10) Patent No.: US 9,019,581 B2
(45) Date of Patent: Apr. 28, 2015

(54) IMAGE PROCESSING APPARATUS AND METHOD

(75) Inventors: Tatsuo Izumi, Kanagawa (JP); Tohru Kanno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 90 days.

(21) Appl. No.: 13/823,396

(22) PCT Filed: Sep. 6, 2011

(86) PCT No.: PCT/JP2011/070678
§ 371 (c)(1),
(2), (4) Date: Mar. 14, 2013

(87) PCT Pub. No.: WO2012/036105
PCT Pub. Date: Mar. 22, 2012

(65) Prior Publication Data
US 2013/0201373 A1   Aug. 8, 2013

(30) Foreign Application Priority Data
Sep. 15, 2010   (JP) ................. 2010-207131

(51) Int. Cl.
| H04N 1/40 | (2006.01) |
| H04N 5/372 | (2011.01) |
| H04N 5/357 | (2011.01) |
| H04N 5/369 | (2011.01) |

(52) U.S. Cl.
CPC ............. *H04N 5/372* (2013.01); *H04N 5/3572* (2013.01); *H04N 5/3692* (2013.01)

(58) Field of Classification Search
USPC ........... 358/1.9, 2.1, 463, 500, 400, 529–530, 358/443
See application file for complete search history.

(56) References Cited

U.S. PATENT DOCUMENTS

| 6,753,913 | B1 | 6/2004 | Bilhan et al. |
| 7,869,086 | B2 | 1/2011 | Soeda |
| 8,023,001 | B2 | 9/2011 | Mizuta |
| 2005/0237402 | A1 | 10/2005 | Sase et al. |
| 2007/0165122 | A1 | 7/2007 | Tsumura et al. |
| 2009/0224952 | A1 | 9/2009 | Funabashi |

FOREIGN PATENT DOCUMENTS

| JP | H03-175878 | 7/1991 |
| JP | H07-193755 | 7/1995 |
| JP | 2001-203891 | 7/2001 |

(Continued)

OTHER PUBLICATIONS

International Search Report Issued Dec. 6, 2011 in PCT/JP2011/070678 filed on Sep. 6, 2011.

*Primary Examiner* — Thomas D Lee
*Assistant Examiner* — Stephen M Brinich
(74) *Attorney, Agent, or Firm* — Cooper & Dunham LLP

(57) ABSTRACT

An image processing apparatus includes an amplifying unit for, during a main scanning line period, amplifying an analog image signal input from a photoelectric conversion element and outputting the signal; an A/D converting unit for analog/digital-converting the signal to digital image data and outputting the data; and a digital offset correcting unit for performing a low-pass filter calculation based on the data to obtain an average value, calculating, based on the average value, a digital correction value used for correcting the data to obtain a desired black offset level, and performing correction on the data using the value. The digital offset correcting unit compares the value to a threshold, reduces the value to be equal to or less than the threshold if the value is equal to or greater than the threshold and updates the value to the reduced value, and performs the low-pass filter calculation and calculates the value.

12 Claims, 25 Drawing Sheets

(56) References Cited

FOREIGN PATENT DOCUMENTS

| | | |
|---|---|---|
| JP | 2002-057945 | 2/2002 |
| JP | 2002-094797 | 3/2002 |
| JP | 2005-311919 | 11/2005 |
| JP | 2006-254008 | 9/2006 |
| JP | 2007-158663 | 6/2007 |
| JP | 2007-194899 | 8/2007 |
| JP | 2008-294567 | 12/2008 |
| JP | 2010-050910 | 3/2010 |
| WO | 2007/055053 A1 | 5/2007 |

MAIN SCANNING DIRECTION →

SUB-SCANNING DIRECTION ↓

NORMAL READ IMAGE

MAIN SCANNING DIRECTION →

SUB-SCANNING DIRECTION ↓

SETTING CODE OF DAC IS CHANGED HERE

READ IMAGE PRODUCED IN CASE WHERE OFFSET VOLTAGE WAS CHANGED DURING IMAGE READING

IMAGE PROCESSING APPARATUS AND METHOD

TECHNICAL FIELD

The present invention is directed to an image processing apparatus and a method for correcting a black offset level which is a reference for an image signal.

BACKGROUND ART

Conventional image processing apparatuses convert an analog image signal, which is acquired by reading an original image using photoelectric conversion elements, to digital image data using a signal processing integrated circuit called an Analog Front-End (hereinafter referred to as "AFE") circuit, and then perform various digital correction processing on the converted digital image data.

FIG. 27 is a circuit diagram showing a structure of an AFE circuit 50 used in an image processing apparatus according to a conventional technology. FIG. 28 is a timing chart at the time when image processing is performed in the AFE circuit 50 of FIG. 27. The image processing apparatus according to the conventional technology converts analog image signals of respective color components of R (red), G (green) and B (blue) input from a CCD (Charge-Coupled Device) to digital image data using the AFE circuit 50 of FIG. 27. Respective systems performing image processing of R, G and B have similar structures.

As illustrated in FIG. 27, in the AFE circuit 50, a clamping circuit 51 applies a predetermined offset voltage (direct-current potential) to an input analog image signal. Then, a sample and hold circuit 52 converts the analog image signal, which includes reset noise, a feed-through level and the like, to a continuous analog image signal by performing sampling and holding operations in response to sampling pulses. An amplifier (VGA) 53 amplifies the analog image signal to a reference voltage level of A/D conversion, and an A/D conversion circuit (referred to as "ADC") 54 analog/digital-converts the amplified analog image signal to 10 bit digital image data.

A black offset level correction circuit 55 of FIG. 27 includes an averaging unit 551, a correction calculating unit 552, a D/A conversion circuit (referred to as "DAC") 553 and the like. The black offset level correction circuit 55 performs black offset correction described below. Here, a period of time when no light is incident on the CCD is referred to as the dark period, and an analog image signal input from the CCD to the AFE circuit 50 during the dark period is referred to as the dark period analog image signal. In addition, digital image data corresponding to the dark period analog image signal converted by the AFE circuit 50 are referred to as dark period digital image data, and a level (value) of the dark period digital image data is referred to as the black offset level. The averaging unit 551 calculates an average value of dark period digital image data of plural pixels. This process is performed in order to calculate the black offset level before correction and a noise component is removed by performing an averaging process. The dark period digital image data are output from the ADC 54 to the black offset level correction circuit 55 during an OPB (Optical Black) pixel transfer period (a period during which effective but optically masked pixels are transferred) within a main scanning line period, as shown in FIG. 28(B), or during an idle transfer period and when a black clamping signal BLKCLP of FIG. 28(C), generated by a timing signal generating circuit (not shown), is at H level. That is, the black offset level correction circuit 55 detects a current black offset level for each main scanning line period.

Thus, the black offset level correction circuit 55 performs feedback control by applying an analog offset voltage to an analog image signal, which is input to the ADC 54 in an analog fashion via the DAC 553, so that the black offset level becomes a predetermined level.

In general, the dark period digital image data value output from the AFE circuit 50 is preferably 0 or more. The ADC 54 does not output a value less than 0 (i.e., a negative value), including noise of data, and therefore, the dark period digital image data value being 0 means that the dark period digital image data are saturated (refer to FIGS. 5 and 7). Accordingly, the voltage of the dark period analog image signal input to the ADC 54 has to be equal to or greater than a lower limit voltage of the dynamic range of the ADC 54 (at this point, the ADC 54 outputs a data value equal to or greater than 0).

Therefore, as black offset correction, the black offset level correction circuit 55 applies an offset voltage to the analog image signal in such a manner that the dark period digital image data value including random noise of the dark period analog image signal and output from the ADC 54 is equal to or greater than 0. In the example of FIG. 27, the black offset level correction circuit 55 performs operations in such a manner that the level of the dark period digital image data (i.e., the black offset level) output from the ADC 54 becomes 10 bits long and 40, which is a target value of the black offset level. The target value depends on the noise level of data of the image processing apparatus, and can be set externally via a CPU interface (not shown) of the AFE circuit 50.

In the case when the dark period digital image data value described above is different from a target value Dave_n, 40, first, the correction calculating unit 552 calculates a difference Δ between the dark period digital image data value and the target value Dave_n, 40. Next, the DAC 553 converts the difference Δ to an analog voltage and feeds it back. Here, when the dynamic range of the ADC 54 is VAD [V], the resolution of the ADC 54 is 10 bits, and the gain of the VGA 53 is α [times], a voltage VOF required to correct the difference Δ can be obtained by the following formula (1).

[Formula 1]

$$VOF = \Delta \div 1023 \times VAD \div \alpha \qquad (1)$$

Herewith, the DAC 553 needs to generate and output adequate voltage. If the resolution of the DAC 553 is 12 bits and the dynamic range of the DAC 553 is VDC [V], it is necessary to set VOF÷VDC×4095 types of codes as setting codes of the DAC 553. The correction calculating unit 552 performs these calculation operations, feeds back the difference Δ between the output data of the ADC 54 and the target value as an analog quantity, and performs black offset correction for each main scanning line period in such a manner that the difference Δ comes close to 0.

In fact, if an analog offset voltage corresponding to the difference Δ detected during a single main scanning line period is fed back for the next main scanning line period at once, the output data of the ADC 54 may oscillate rather than converge to the target value due to variability in the dynamic ranges of the ADC 54 and the DAC 553 and noise included in the difference Δ. Therefore, the black offset correction is performed using a value obtained by multiplying the difference Δ by a coefficient β smaller than 1. Accordingly, the output data of the ADC 54 is not corrected to be the target value in a single black offset correction, but rather corrected to gradually follow the target value in several black offset corrections.

DISCLOSURE OF THE INVENTION

Problems to be Solved by the Invention

However, according to the above-described black offset correction of the conventional technology, the range of the output voltage (i.e., dynamic range) required for the DAC 553 in order to perform the black offset correction has to be the sum of an analog voltage corresponding to an offset level required for the output data of the ADC 54 (40 in the above-described case) and a voltage obtained by adding an offset voltage caused by leakage current occurring at an input unit, like the clamping circuit 51, of the AFE circuit 50 and an offset voltage occurring in a circuit inside the AFE circuit 50. In general, the dynamic range has to be about ±300 mV, including enough margin. Table 1 shows an example of the relationship between setting codes input to the DAC 553 by the correction calculating unit 552 and the output voltage of the DAC 553.

TABLE 1

| SETTING CODE | OUTPUT VOLTAGE OF DAC 553 [mV] |
|---|---|
| 4095 | 300 |
| □ | □ |
| 2050 | 600 ÷ 4095 × 2 |
| 2049 | 600 ÷ 4095 × 1 |
| 2048 | 0 |
| 2047 | 600 ÷ 4095 × (−1) |
| 2046 | 600 ÷ 4095 × (−2) |
| □ | □ |
| 0 | −300 |

Next is described the resolution required for the DAC 553. The black offset correction according to the conventional technology continues to be performed regardless of whether image reading is being performed. Accordingly, there is a possibility of the black offset level changing at a later time after correction and then the setting code of the DAC 553 changing (for example, gradual change in the black offset level due to temperature change with time). Therefore, in the case where the resolution of the DAC 553 is coarse, the offset voltage output from the DAC 553 is changed significantly when the setting code of the DAC 553 is changed. If the setting code of the DAC 553 changes during image reading, a difference in density appears in a read image, as shown in FIG. 30. On the other hand, FIG. 29 shows an example of a read image in the case where there is no change in the setting code of the DAC 553 of FIG. 27 during image reading. Thus, the resolution of the DAC 553 has to be fine enough that, even if the setting code is changed by 1, the change cannot be recognized in the read image.

Especially, in general, the change of the black offset level with time occurs gradually after the image processing apparatus is powered on, and thus the change does not occur in a short period of time of one scan (for example, two to five seconds). However, the black offset correction cannot be stopped even during scanning. This is because, in the output signal of the CCD, the offset level changes between when a significant amount of white data is present in one main scanning line period due to smear and when a small amount of white data is present. As described above, according to the AFE circuit 50 of the conventional technology, the DAC 553 needs to have a wide dynamic range and high resolution. Mounting such a DAC 553 having a wide dynamic range and high resolution inside the AFE circuit 50 leads to an increase in the chip area as well as an increase in the cost.

Also, if the DAC 553 with a high resolution of, for example, 12 bits is mounted inside the AFE circuit 50, it becomes technically difficult to ensure a differential nonlinearity (DNL) error of the DAC 553. In the case when the DNL error of the DAC 553 is large, even if the setting code of the DAC 553 is changed by only 1 during the black offset correction, an abnormally large change in the output voltage occurs if the change in the setting code occurs at a part with a large DNL error. Accordingly, this case possibly suffers the same problem (a density difference in the read image) as when the DAC 553 has low resolution.

In addition, the DAC 553 needs to supply an offset voltage corresponding to the target value for the output data of the ADC 54. Therefore, if the target value is set to high, the positive-side dynamic range of the DAC 553 is consumed, thus wasting the dynamic range of the DAC 553.

Other than the above-described conventional technology, related technologies are disclosed in Patent Documents 1 to 3. However, the above-mentioned problems cannot be solved using any of Patent Documents 1 to 3.

Patent Document 1: Japanese Laid-open Patent Application Publication No. 2008-294567
Patent Document 2: Japanese Laid-open Patent Application Publication No. 2007-158663
Patent Document 3: Japanese Laid-open Patent Application Publication No. 2005-311919

Accordingly, in view of the above-described problems of the conventional technologies, the present invention aims at providing an image processing apparatus and a method capable of reducing the chip area and performing accurate adjustment of the black offset level compared to the conventional technologies.

Means for Solving the Problems

An image processing apparatus of the present invention includes an amplifying unit configured to, during a main scanning line period, amplify an analog image signal input from a photoelectric conversion element and output the amplified analog image signal; an A/D converting unit configured to analog/digital-convert the analog image signal input from the amplifying unit to digital image data and output the digital image data; and a digital offset correcting unit configured to perform a low-pass filter calculation based on the digital image data output from the A/D converting unit to obtain an average value, calculate, based on the average value, a digital correction value used for correcting the digital image data so as to obtain a desired black offset level, and perform correction on the digital image data using the digital correction value. The digital offset correcting unit compares the digital correction value to a predetermined threshold, reduces the digital correction value to be equal to or less than the threshold if the digital correction value is equal to or greater than the threshold and updates the digital correction value to the reduced value, and subsequently performs the low-pass filter calculation based on the digital image data and calculates the digital correction value.

Also, in the image processing apparatus of the present invention, the main scanning line period includes in order an OPB pixel transfer period during which an analog image signal corresponding to effective but optically masked pixels of the photoelectric conversion element is input from the photoelectric conversion element; an effective pixel transfer period during which an analog image signal corresponding to effective pixels of the photoelectric conversion element is input from the photoelectric conversion element; and an idle transfer period during which an analog image signal corresponding to pixels other than the effective pixels of the photoelectric conversion element is input from the photoelectric conversion element.

Furthermore, in the image processing apparatus of the present invention, in the idle transfer period, the digital offset correcting unit compares the digital correction value to the predetermined threshold, reduces the digital correction value to be equal to or less than the threshold if the digital correction value is equal to or greater than the threshold and updates the digital correction value to the reduced value, and subsequently performs the low-pass filter calculation based on the digital image data and calculates the digital correction value.

Furthermore, in the image processing apparatus of the present invention, in the effective pixel transfer period, the digital offset correcting unit compares the digital correction value to the predetermined threshold, reduces the digital correction value to be equal to or less than the threshold if the digital correction value is equal to or greater than the threshold and updates the digital correction value to the reduced value, and then, in the idle transfer period, the digital offset correcting unit performs the low-pass filter calculation based on the digital image data and calculates the digital correction value.

In addition, the image processing apparatus of the present invention further includes a first conversion and addition unit configured to, using a first D/A converting unit, digital/analog-convert first code data corresponding to the reduced value which is used by the digital offset correcting unit to update the digital correction value, add the converted first code data to the analog image signal input from the photoelectric conversion element, and output a resultant of the addition to the amplifying unit; a second conversion and addition unit configured to, using a second D/A converting unit, digital/analog-convert predetermined second code data input thereto, add the converted second code data to the analog image signal input from the amplifying unit, and output a resultant of the addition to the A/D converting unit; a control subtraction unit configured to, based on the second code data, subtract, from the digital image data output from the A/D converting unit, an additional value of the second conversion and addition unit or a value obtained by subtracting a predetermined value from the additional value, and output a resultant of the subtraction to the digital offset correcting unit; and a reference voltage and current generating circuit formed in a single manufacturing process and configured to generate a first reference current for setting a dynamic range of an output signal from the first D/A converting unit, a second reference current for setting a dynamic range of an output signal of the second D/A converting unit, and a reference voltage for setting a dynamic range of an input signal to the A/D converting unit.

An image processing method of the present invention includes an amplifying step of, during a main scanning line period using an amplifying unit, amplifying an analog image signal input from a photoelectric conversion element and outputting the amplified analog image signal; an A/D converting step of analog/digital-converting the analog image signal input from the amplifying unit to digital image data and outputting the digital image data; and a digital offset correcting step of performing a low-pass filter calculation based on the digital image data output from the A/D converting unit to obtain an average value, calculating, based on the average value, a digital correction value used for correcting the digital image data so as to obtain a desired black offset level, and performing correction on the digital image data using the digital correction value. In the digital offset correcting step, the digital correction value is compared to a predetermined threshold, the digital correction value is reduced to be equal to or less than the threshold if the digital correction value is equal to or greater than the threshold and the digital correction value is updated to the reduced value, and subsequently the low-pass filter calculation is performed based on the digital image data and the digital correction value is calculated.

Also, in the image processing method of the present invention, the main scanning line period includes in order an OPB pixel transfer period during which an analog image signal corresponding to effective but optically masked pixels of the photoelectric conversion element is input from the photoelectric conversion element; an effective pixel transfer period during which an analog image signal corresponding to effective pixels of the photoelectric conversion element is input from the photoelectric conversion element; and an idle transfer period during which an analog image signal corresponding to pixels other than the effective pixels of the photoelectric conversion element is input from the photoelectric conversion element.

Furthermore, in the image processing method of the present invention, in the digital offset correcting step, during the idle transfer period, the digital correction value is compared to the predetermined threshold, the digital correction value is reduced to be equal to or less than the threshold if the digital correction value is equal to or greater than the threshold and the digital correction value is updated to the reduced value, and subsequently the low-pass filter calculation is performed based on the digital image data and the digital correction value is calculated.

Furthermore, in the image processing method of the present invention, in the digital offset correcting step, during the effective pixel transfer period, the digital correction value is compared to the predetermined threshold, the digital correction value is reduced to be equal to or less than the threshold if the digital correction value is equal to or greater than the threshold and the digital correction value is updated to the reduced value, and subsequently the low-pass filter calculation is performed based on the digital image data and the digital correction value is calculated.

In addition, the image processing method of the present invention further includes a first conversion and addition step of, using a first D/A converting unit, digital/analog-converting first code data corresponding to the reduced value which is used in the digital offset correcting step for updating the digital correction value, adding the converted first code data to the analog image signal input from the photoelectric conversion element, and outputting a resultant of the addition to the amplifying unit; a second conversion and addition step of, using a second D/A converting unit, digital/analog-converting input predetermined second code data, adding the converted second code data to the analog image signal input from the amplifying unit, and outputting a resultant of the addition to the A/D converting unit; a control subtraction step of, based on the second code data, subtracting, from the digital image data output from the A/D converting unit, an additional value of the second conversion and addition step or a value obtained by subtracting a predetermined value from the additional value, and outputting a resultant of the subtraction to the digital offset correcting unit; and a step of, using a reference voltage and current generating circuit formed in a single manufacturing process, generating a first reference current for setting a dynamic range of an output signal from the first D/A converting unit, a second reference current for setting a dynamic range of an output signal of the second D/A converting unit, and a reference voltage for setting a dynamic range of an input signal to the A/D converting unit.

Effects of the Present Invention

According to the image processing apparatus of the present invention, after outputting the first code data to the first D/A converting unit, the digital offset correcting unit performs a low-pass filter calculation based on the digital image data output from the A/D converting unit and calculates the digital correction value based on the average value, and then performs correction on the digital image data. Accordingly, the digital offset correcting unit is able to correct a DNL error and settling error of the first D/A converting unit, which allows accurate adjustment of the black offset level.

In addition, according to the image processing apparatus of the present invention, the reference voltage and current generating circuit sets the dynamic ranges of the output signals of the first and second D/A converting units and the dynamic range of the input signal to the A/D converting unit. Herewith, even if the reference voltage and current generating circuit has individual variability (process variability), the variability does not affect the relationships of the dynamic ranges.

Furthermore, according to the image processing apparatus of the present invention, the second conversion and addition unit digital/analog-converts predetermined second code data input thereto using the second D/A converting unit, adds the converted second code data to the analog image signal input from the amplifying unit, and outputs the resultant to the A/D converting unit. Herewith, it is possible to prevent the digital image data output from the A/D converting unit from becoming zero. In addition, based on the second code data, the control subtraction unit subtracts, from the digital image data output from the A/D converting unit, an additional value of the second conversion and addition unit or a value obtained by subtracting a predetermined value from the additional value, and outputs the resultant to the digital offset correcting unit. Then, the digital offset correcting unit performs correction on the digital image data so as to obtain a desired black offset level. Therefore, it is possible to prevent a density difference in an image involved with a change in the output signal of the second D/A converting unit, and also eliminate the necessity for the second D/A converting unit to have a wide dynamic range and high resolution. As a result, the chip area as well as cost can be reduced compared to the conventional technology.

Furthermore, according to the image processing apparatus of the present invention, the digital offset correcting unit compares the digital correction value to the predetermined threshold. If the digital correction value is equal to or greater than the threshold, the digital offset correcting unit reduces the digital correction value to be equal to or less than the threshold and updates the digital correction value, and then outputs, to the first conversion and addition unit, first code data corresponding to the reduced value updated as the digital correction value. The first conversion and addition unit digital/analog-converts the first code data using the first D/A converting unit, adds the converted first code data to the analog image single input from the photoelectric conversion element, and outputs the resultant to the amplifying unit. Herewith, it is possible to correct a large deviation in the black offset level without narrowing the dynamic range of the A/D converting unit.

According to the image processing method of the present invention, in the digital offset correcting step, after the first code data is output to the first D/A converting unit, a low-pass filter calculation is performed based on the digital image data output from the A/D converting unit and the digital correction value is calculated based on the average value, and correction is then performed on the digital image data. Accordingly, a DNL error and settling error of the first D/A converting unit are corrected in the digital offset correcting step, which allows accurate adjustment of the black offset level.

In addition, according to the image processing method of the present invention, the reference voltage and current generating circuit sets the dynamic ranges of the output signals of the first and second D/A converting units and the dynamic range of the input signal to the A/D converting unit. Herewith, even if the reference voltage and current generating circuit has individual variability (process variability), the variability does not affect the relationships of the dynamic ranges.

Furthermore, according to the image processing method of the present invention, in the second conversion and addition step, input predetermined second code data are digital/analog-converted using the second D/A converting unit, then the converted second code data are added to the analog image signal input from the amplifying unit, and the resultant is output to the A/D converting unit. Herewith, it is possible to prevent the digital image data output from the A/D converting unit from becoming zero. In addition, in the control subtraction step, based on the second code data, the additional value obtained in the second conversion and addition step or a value obtained by subtracting a predetermined value from the additional value is subtracted from the digital image data output from the A/D converting unit, and the resultant is output to the digital offset correcting step. Then, in the digital offset correcting step, correction is performed on the digital image data so as to obtain a desired black offset level. Therefore, it is possible to prevent a density difference in an image involved with a change in the output signal of the second D/A converting unit, and also eliminate the necessity for the second D/A converting unit to have a wide dynamic range and high resolution. As a result, the chip area as well as cost can be reduced compared to the conventional technology.

Furthermore, according to the image processing method of the present invention, in the digital offset correcting step, the digital correction value is compared to the predetermined threshold. If the digital correction value is equal to or greater than the threshold, the digital correction value is reduced to be equal to or less than the threshold and then updated. In addition, first code data corresponding to the reduced value updated as the digital correction value are output to the first conversion and addition step. In the first conversion and addition step, the first code data are digital/analog-converted using the first D/A converting unit, the converted first code data are added to the analog image signal input from the photoelectric conversion element, and the resultant is then output to the amplifying unit. Herewith, it is possible to correct a large deviation in the black offset level without narrowing the dynamic range of the A/D converting unit.

DESCRIPTION OF THE REFERENCE NUMERALS

10: IMAGE PROCESSING APPARATUS
11: CONTACT GLASS
12: XENON LAMP
13, 14, 15: REFLECTOR MIRROR
16, 17: CARRIAGE
18: LENS UNIT
19: CCD LINEAR IMAGE SENSOR
20, 20A: SENSOR BOARD
21: SIGNAL PROCESSING UNIT
22: ORIGINAL DOCUMENT
23: WHITE REFERENCE PLATE
55: BLACK OFFSET LEVEL CORRECTION CIRCUIT
201: CAPACITOR
202, 202A, 202B, 50: ANALOG FRONT-END CIRCUIT
203: OSCILLATOR
204, 204A: TIMING SIGNAL GENERATING CIRCUIT
204a: REGISTER
204b: CPU INTERFACE
205, 211: INTERFACE UNIT
212: LINE-TO-LINE CORRECTION CIRCUIT
213: SHADING CORRECTION CIRCUIT
214: γ CORRECTION CIRCUIT
215: CPU
2021, 51: CLAMPING CIRCUIT
2022, 52: SAMPLE AND HOLD CIRCUIT
2023, 53: AMPLIFIER
2024, 2024B, 54: A/D CONVERSION CIRCUIT
2025, 2025A, 2025B: DIGITAL OFFSET CORRECTING UNIT
2025a, 2025Aa, 2025aB, 552: CORRECTION CALCULATING UNIT
2025b, 551: AVERAGING UNIT
2025bB: FILTER PROCESSING UNIT
2025c: REGISTER
2026, 2026B: OFFSET ADDING UNIT
2027, 2027B: ZERO LEVEL CORRECTING UNIT
2027a, 2027Ab, 553: D/A CONVERSION CIRCUIT
2027b: ZERO LEVEL CONTROLLER
2028: CPU INTERFACE 2029, 2029B: D/A CONVERSION CIRCUIT
AD1, AD2, AD3, 56: ADDER
GC1: REFERENCE VOLTAGE AND CURRENT GENERATING CIRCUIT
SU1: SUBTRACTOR

BEST MODE FOR CARRYING OUT THE INVENTION

First Embodiment

Figure 1:
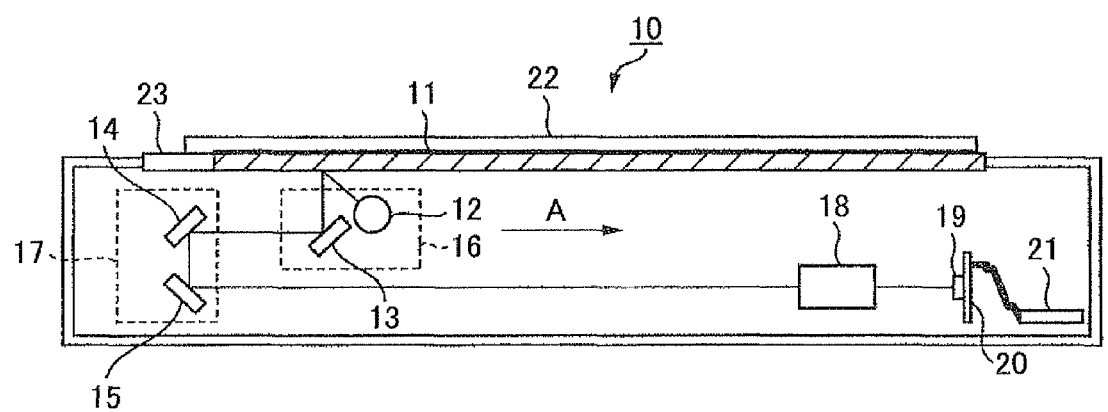
FIG. 1 is a block diagram showing a structure of an image processing apparatus 10 according to a first embodiment of the present invention.

FIG. 1 is a block diagram showing a structure of an image processing apparatus 10 according to a first embodiment of the present invention. In FIG. 1, the image processing apparatus 10 includes a contact glass 11 on which an original document 22 is placed; a first carriage 16 including a xenon lamp 12 for original document exposure and a first reflector mirror 13; a second carriage 17 including a second reflector mirror 14 and a third reflector mirror 15; a lens unit 18 for forming a read image on a CCD linear image sensor (hereinafter referred to as the CCD) 19 which is a photoelectric conversion element; the CCD 19; a sensor board 20; a signal processing unit 21; and a white reference plate 23 for correcting various types of distortions created by an optical reading system and the like.

In the image processing apparatus 10 with the above structure, when an image is read by irradiating the original document with light to scan over the original document, the first carriage 16 and the second carriage 17 are moved in a sub-scanning direction A by a stepper motor or the like (not shown). The COD 19 reads an analog image signal for one line during a main scanning line period specified by a main scanning synchronization signal. Subsequently, the first carriage 16 and the second carriage 17 move in the sub-scanning direction A, and the CCD 19 reads an analog image signal for one line during the next main scanning line period. The image processing apparatus 10 of FIG. 1 reads the original image using the CCD 19 by repeating the foregoing operation, converts the analog image signal to digital image data, and performs various image processing.

Figure 2:
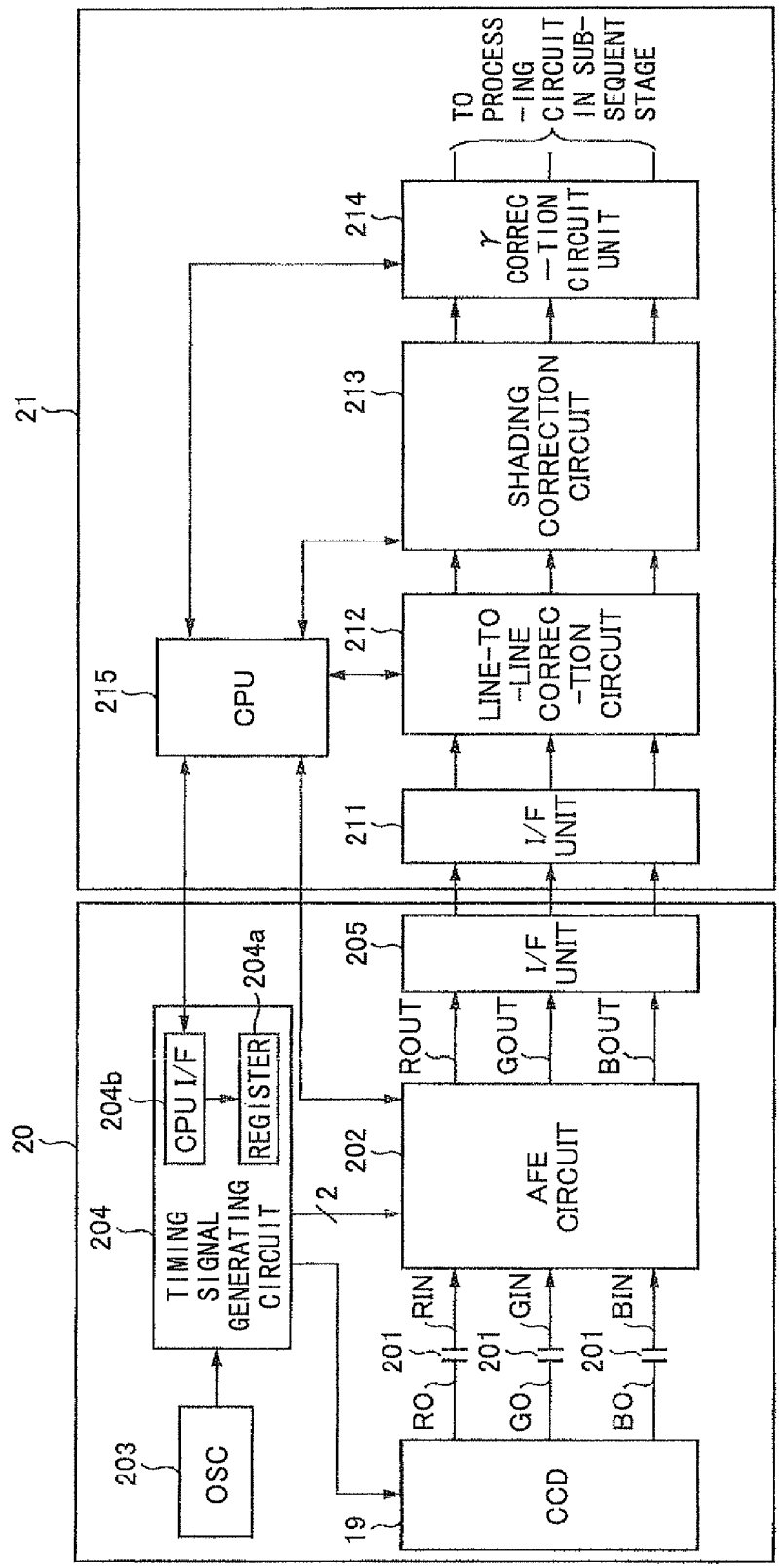
FIG. 2 is a block diagram showing structures of a sensor board 20 and a signal processing unit 21 of FIG. 1.

FIG. 2 is a block diagram showing structures of the sensor board 20 and the signal processing unit 21 of FIG. 1. As shown in FIG. 2, the sensor board 20 includes an oscillator (OSC) 203, a timing signal generating circuit 204 including a register 204a and a CPU interface 204b, the CCD 19, capacitors 201, an Analog Front-End (AFE) circuit 202, and an interface unit (I/F unit) 205. Also as shown in FIG. 2, the signal processing unit 21 includes a CPU (Central Processing Unit) 215, an interface unit (I/F unit) 211, a line-to-line correction circuit 212, a shading correction circuit 213, a γ correction circuit 214 and other processing circuits (not shown).

In the sensor board 20 of FIG. 2, the oscillator (OSC) 203 generates a predetermined clock signal and outputs the clock signal to the timing signal generating circuit 204. The timing signal generating circuit 204 includes the register 204a for determining an operating state and the CPU interface 204b, and information stored in the register 204a is changed by serial communication with the CPU 215 via the CPU interface 204b. The timing signal generating circuit 204 structured in the above-described manner outputs, to the CCD 19, drive pulses for driving the CCD 19 at a timing based on the information stored in the register 204a. Based on the information stored in the register 204a, the timing signal generating circuit 204 also generates a sampling pulse SP for driving the AFE circuit 202 during an OPB pixel transfer period to be described below and a black clamping signal BLKCLP, and outputs these to the AFE circuit 202.

The CCD 19 outputs, to the AFE circuit 202 via the capacitors 201, analog image signals RO, GO and BO for respective optical separation colors of red, green and blue, in synchronization with the drive pulses from the timing signal generating circuit 204 during the main scanning line periods described above. Here, when no light being input to the CCD 19 is referred to as the dark period, an analog image signal input from the CCD 19 to the AFE circuit 202 during the dark period is referred to as the dark period analog image signal. In the main scanning line period, the CCD 19 first outputs an analog image signal corresponding to OPB pixels (which are effective but optically masked pixels of the CCD 19), then outputs an analog image signal corresponding to effective pixels of the CCD 19, and subsequently outputs an analog image signal corresponding to pixels other than the effective pixels of the CCD 19. Hereinafter, a period during which the CCD 19 outputs the analog image signal corresponding to the OPB pixels is referred to as the OPB pixel transfer period, a period during which the CCD 19 outputs the analog image signal corresponding to the effective pixels is referred to as the effective pixel transfer period, and a period during which the CCD 19 outputs the analog image signal corresponding to the pixels other than the effective pixels is referred to as the idle transfer period. That is, the main scanning line period includes the OPB pixel transfer period, the effective pixel transfer period and the idle transfer period in order. The analog image signals output from the CCD 19 during the OPB pixel transfer period and the idle transfer period are the same as the above-described dark period analog image signal, and therefore, the signals output during these periods are also referred to as the dark period analog image signals.

As described above, since the CCD 19 and the AFE circuit 202 are AC-coupled via the capacitors 201, analog image signals RIN, GIN and BIN, which are formed by removing DC components from the analog image signals RO, GO and BO, are input to the AFE circuit 202. As later described in detail, the AFE circuit 202 converts the input analog image signals RIN, GIN and BIN to digital image data ROUT, GOUT and BOUT and outputs the digital image data to the signal processing unit 21 via the interface unit 205. Here, digital image data corresponding to the dark period analog image signals converted by the AFE circuit 202 are referred to as the dark period digital image data, and the level (value) of the dark period digital image data is referred to as the black offset level.

In the signal processing unit 21 of FIG. 2, the line-to-line correction circuit 212 performs correction of sub-scanning direction delays among the RGB output signals of the CCD 19 on the digital image data input via the interface unit 211, and outputs the corrected digital image data to the shading correction circuit 213. For the input digital image data, the shading correction circuit 213 corrects variation in the sensitivity of the CCD 19 and unevenness in the light distribution of the irradiation system using a predetermined density level, which is obtained by the CCD 19 reading light reflected from the white reference plate 23 irradiated by the xenon lamp 12 of FIG. 1, and outputs the corrected digital image data to the γ correction circuit unit 214. Furthermore, the γ correction circuit unit 214 performs γ correction processing on the input digital image data and outputs the processed digital image data to a processing circuit in the subsequent stage. The line-to-line correction circuit 212, the shading correction circuit 213 and the γ correction circuit unit 214 operate based on a control signal from the CPU 215.

The CPU 215 writes, in the register 204a via the CPU interface 204b, information used to determine operations of the timing signal generating circuit 204. The CPU 215 also outputs, to the AFE circuit 202, information used to determine operations of the AFE circuit 202. Furthermore, the CPU 215 outputs control signals to the line-to-line correction circuit 212, the shading correction circuit 213 and the γ correction circuit unit 214.

Figure 3:
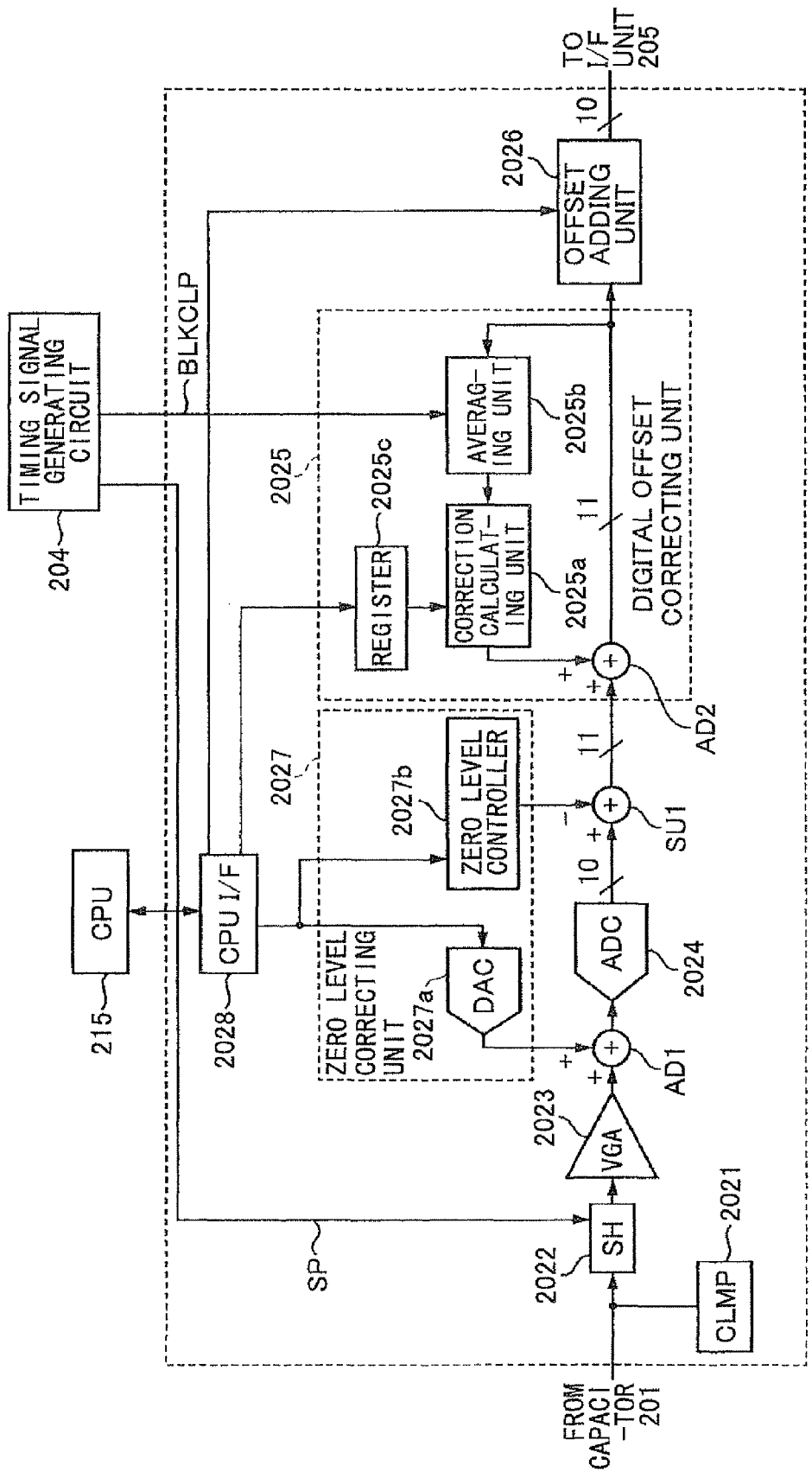
FIG. 3 is a block diagram showing a structure of an AFE circuit 202 of FIG. 2.

FIG. 3 is a block diagram showing a structure of the AFE circuit 202 of FIG. 2. Note that the block diagram of FIG. 3 shows the structure of one of the three systems of red, green and blue shown in FIG. 2. The structures of the other two systems are the same as the structure shown in FIG. 3, and their descriptions are therefore omitted herein.

In FIG. 3, the AFE circuit 202 includes a clamping circuit (CLMP) 2021, a sample and hold circuit (SH) 2022, an amplifier (VGA) 2023, an adder AD1, an A/D conversion circuit (hereinafter referred to as the ADC) 2024 which is an A/D converting unit, a subtractor SU1, a digital offset correcting unit 2025, an offset adding unit 2026, a zero level correcting unit 2027 and a CPU interface 2028.

Also, in FIG. 3, the digital offset correcting unit 2025 includes an averaging unit 2025b, a correction calculating unit 2025a, a register 2025c and an adder AD2. The zero level correcting unit 2027 includes a zero level controller 2027b and a D/A conversion circuit (referred to as the DAC) 2027a with a resolution of, for example, 2 bits.

In FIG. 3, the clamping circuit 2021 applies a predetermined offset voltage (DC potential) to the analog image signal from the capacitor 201. The sample and hold circuit 2022 samples the analog image signal, which includes reset noise, a feed-through level and the like, in response to the sampling pulse SP from the timing signal generating circuit 204 and holds the analog image signal, and converts the analog image signal to a continuous analog image signal and outputs the converted analog image signal to the amplifier 2023. The amplifier 2023 amplifies the input analog image signal to a reference voltage level required for A/D conversion and outputs the amplified analog image signal to the adder AD1.

Also, in FIG. 3, the DAC 2027a generates an analog offset voltage VOF1 based on a setting code S1 input from the CPU 215 via the CPU interface 2028 and outputs the analog offset voltage VOF1 to the adder AD1. The adder AD1 adds the analog offset voltage VOF1 from the DAC 2027a to the analog image signal from the amplifier 2023 and outputs the resultant to the ADC 2024. The ADC 2024 analog/digital-converts the input analog image signal to digital image data of 10 bits and outputs the converted digital image data to the subtractor SU1.

The zero level controller 2027b generates digital offset data DOF1 based on the setting code S1 input from the CPU 215 via the CPU interface 2028 and outputs the digital offset data DOF1 to the subtractor SU1. To the zero level controller 2027b, a setting code the same as the above-mentioned setting code S1 input to the DAC 2027a is input. The subtractor SU1 subtracts the digital offset data DOF1 input from the zero level controller 2027b from the digital image data input from the ADC 2024 and outputs the resultant to the digital offset correcting unit 2025. Since the subtraction of the digital offset data DOF1 at the subtractor SU1 involves positive- or negative-polarity, the digital image data output from the subtractor SU1 are of 11 bits including a sign bit although the digital image data output from the ADC 2024 are of 10 bits.

Next is described operations of the zero level correcting unit 2027 in detail. First, the DAC 2027a is described in detail. The analog offset voltage VOF1 generated by the DAC 2027a is a voltage applied to the analog image signal input to the ADC 2024 during a dark period so that the voltage of the analog image signal, including noise, a voltage caused by leakage current of an input unit of the AFE circuit 202, such as the clamping circuit 2021, and a voltage generated inside the AFE circuit 202, does not fall outside the dynamic range of the ADC 2024. That is, the above analog offset voltage VOF1 is applied so that the voltage of the analog image signal input to the ADC 2024, including noise and offset voltages generated in internal circuits of the AFE circuit 202, becomes equal to or greater than a lower limit voltage of the dynamic range of the ADC 2024. Herewith, the digital image data value output from the ADC 2024 always becomes equal to or greater than zero even if the analog image signal input to the ADC 2024 is a dark period analog image signal, thereby preventing data saturation in the ADC 2024. Next is described this principle with reference to FIGS. 4 to 9.

Figure 4:
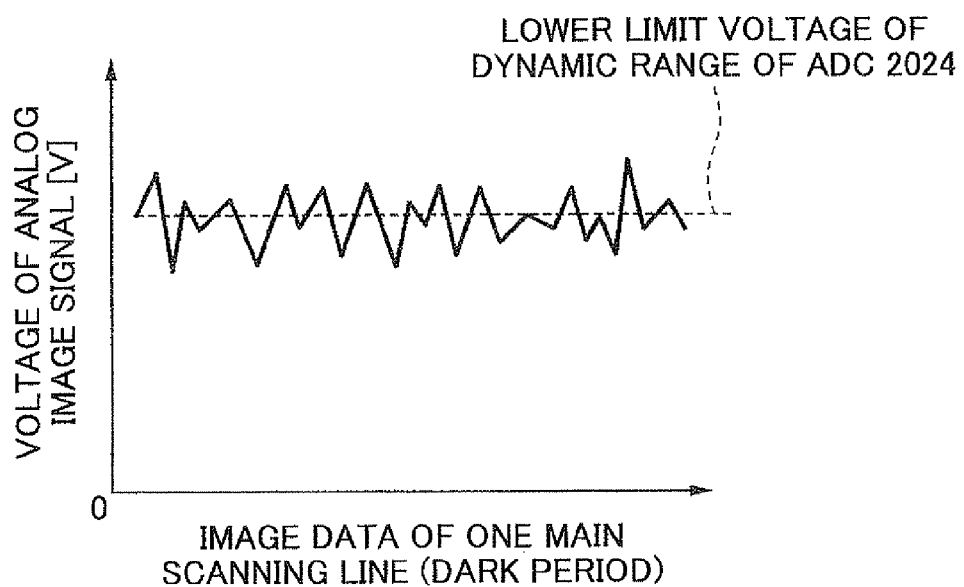
FIG. 4 is a graph showing that voltage of an analog image signal input to an ADC 2024 of FIG. 3 is close to a lower limit voltage of a dynamic range of the ADC 2024 of FIG. 3.
Figure 5:
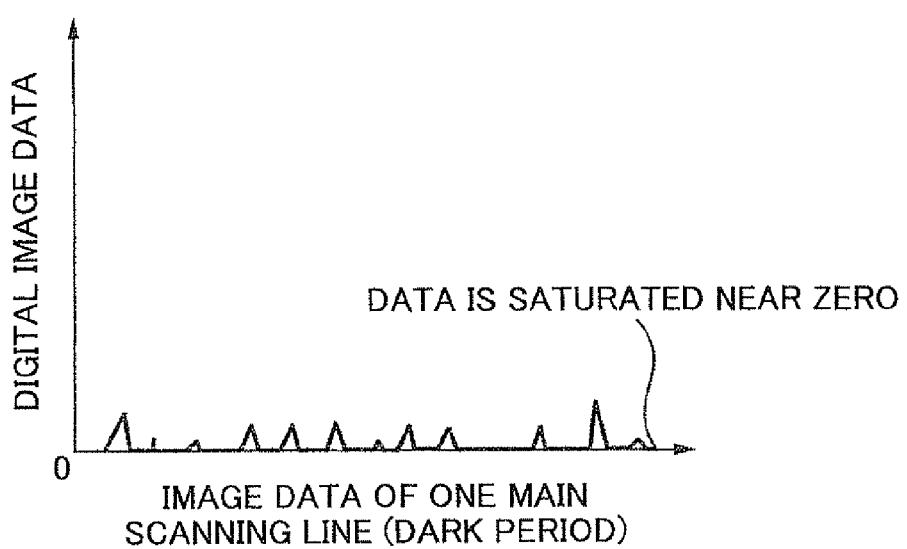
FIG. 5 is a graph showing digital image data output from the ADC 2024 of FIG. 3 when the analog image signal of FIG. 4 is input to the ADC 2024 of FIG. 3.

FIG. 4 is a graph showing that the voltage of the analog image signal input to the ADC 2024 of FIG. 3 is close to the lower limit voltage of the dynamic range of the ADC 2024 of FIG. 3. FIG. 5 is a graph showing digital image data output from the ADC 2024 of FIG. 3 when the analog image signal of FIG. 4 is input to the ADC 2024 of FIG. 3. When the analog image signal fluctuating near the lower limit voltage of the dynamic range of the ADC 2024, as shown in FIG. 4, is analog/digital-converted using the ADC 2024, the digital image data output from the ADC 2024 is saturated near zero, as shown in FIG. 5.

Figure 6:
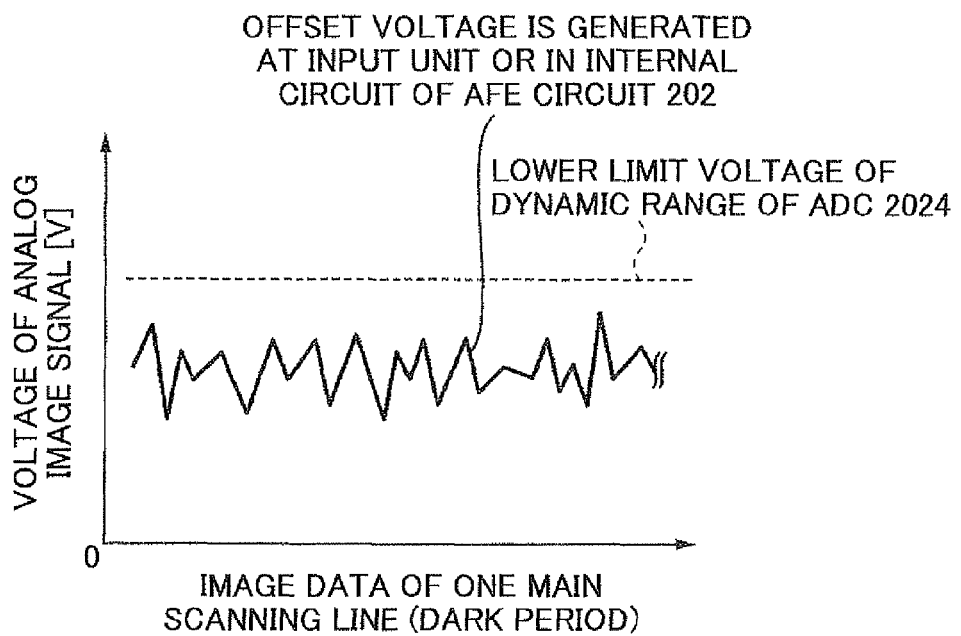
FIG. 6 is a graph showing that the voltage of the analog image signal input to the ADC 2024 of FIG. 3 is lower than the lower limit voltage of the dynamic range of the ADC 2024 of FIG. 3.
Figure 7:
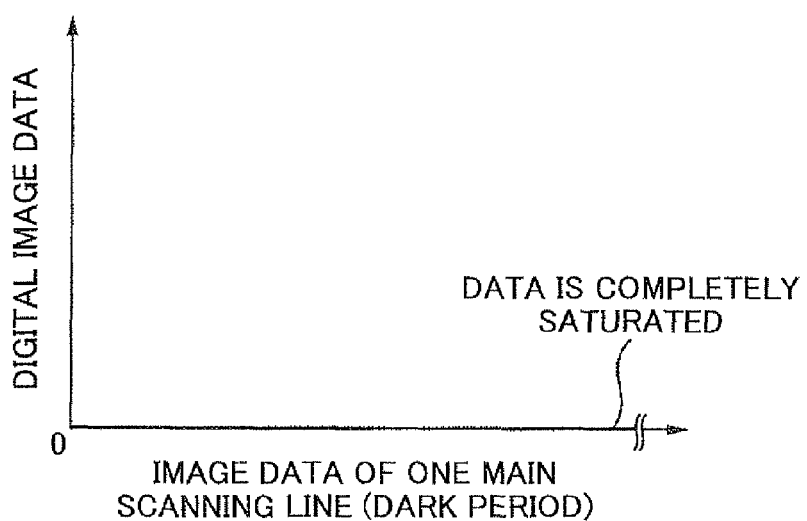
FIG. 7 is a graph showing digital image data output from the ADC 2024 of FIG. 3 when the analog image signal of FIG. 6 is input to the ADC 2024 of FIG. 3.

FIG. 6 is a graph showing that the voltage of the analog image signal input to the ADC 2024 of FIG. 3 is lower than the lower limit voltage of the dynamic range of the ADC 2024 of FIG. 3. FIG. 7 is a graph showing digital image data output from the ADC 2024 of FIG. 3 when the analog image signal of FIG. 6 is input to the ADC 2024 of FIG. 3. The analog image signal shown in FIG. 6 is generated when an offset voltage is generated at an input unit of the AFE circuit 202, such as the clamping circuit 2021, or in an internal circuit of the AFE circuit 202. When the analog image signal lower than the lower limit voltage of the dynamic range of the ADC 2024, as shown in FIG. 6, is analog/digital-converted using the ADC 2024, the digital image data output from the ADC 2024 are completely saturated to zero, as shown in FIG. 7.

Given this factor, the AFE circuit 202 prevents the digital image data output from the ADC 2024 from being saturated by applying the analog offset voltage VOF1 generated by the DAC 2027a to the analog image signal input to the ADC 2024.

Figure 8:
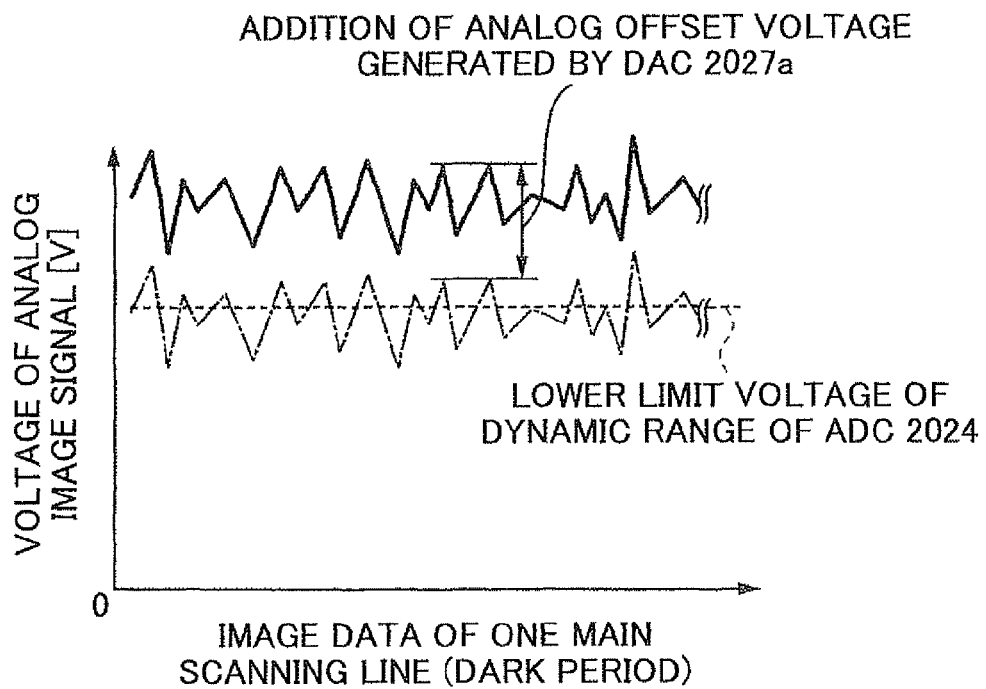
FIG. 8 is a graph showing voltage of an analog image signal obtained by adding an analog offset voltage VOF1 generated by a DAC 2027a to the analog image signal input to the ADC 2024.
Figure 9:
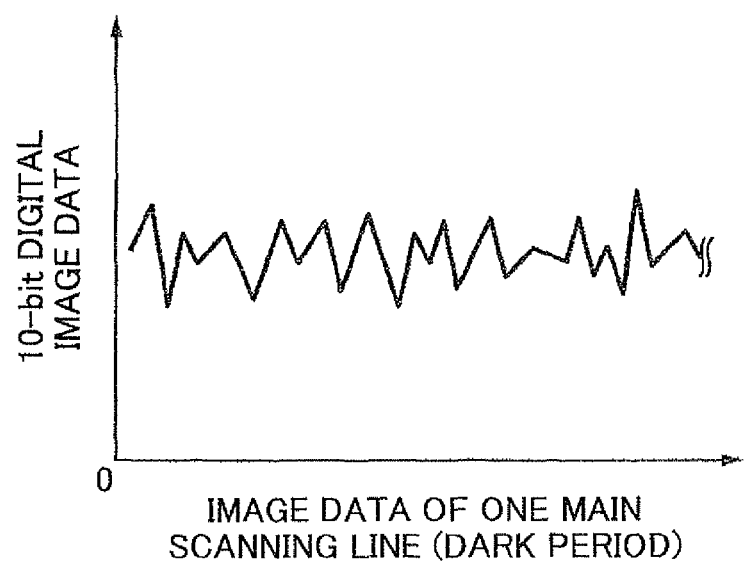
FIG. 9 is a graph showing digital image data output from the ADC 2024 of FIG. 3 when the analog image signal of FIG. 8 is input to the ADC 2024 of FIG. 3.

FIG. 8 is a graph showing the voltage of an analog image signal obtained by adding the analog offset voltage VOF1 generated by the DAC 2027a to the analog image signal input to the ADC 2024. FIG. 9 is a graph showing digital image data output from the ADC 2024 of FIG. 3 when the analog image signal of FIG. 8 is input to the ADC 2024 of FIG. 3. As shown in FIG. 8, the voltage of the analog image signal input to the ADC 2024 (voltage indicated by the solid line) has increased by the added analog offset voltage VOF1 from the vicinity of the lower limit voltage of the dynamic range of the ADC 2024 (voltage indicated by the dashed-dotted line). Then, the analog image signal of FIG. 8, to which the analog offset voltage VOF1 has been added, is analog/digital-converted by the ADC 2024, and thereby unsaturated digital image data, as shown in FIG. 9, are obtained.

Next are described the setting code S1 input to the DAC 2027a and the analog offset voltage VOF1 generated by the DAC 2027a. Here, the DAC 2027a is a small D/A conversion circuit with a dynamic range of VDAC and a resolution of N1 bits (for example, 2 bits). The analog offset voltage VOF1 output from the DAC 2027a and corresponding to the setting code S1 (S1=0, 1, ..., $2^{N1}-1$) input from the CPU 215 via the CPU interface 2028 is expressed by, for example, the following formula (2).

[Formula 2]

$$VOF1 = VDAC \times S1 \div (2^{N1}-1) \qquad (2)$$

The setting code S1 of the DAC 2027a is set once after the power is turned on, and is not changed after that. The setting code S1 of the DAC 2027a is determined depending on a random noise component of the analog image signal, an offset voltage likely to be generated in the AFE circuit 202 and the like. In general, in the case when the random noise component of the analog image signal is large or when the offset voltage likely to be generated in the AFE circuit 202 is high, the setting code S1 is set in such a manner that the analog offset voltage VOF1 becomes high.

Next is described the zero level controller 2027b in detail. The zero level controller 2027b receives a setting code S1 the same as the setting code S1 input to the DAC 2027a, converts the analog offset voltage VOF1 generated by the DAC 2027a based on the setting code S1 to digital offset data DOF1, and outputs the digital offset data DOF1 to the subtractor SU1. Here, if the dynamic range and the resolution of the ADC 2024 are VADC and NADC bits (for example, 10 bits), respectively, the relationship between the analog offset voltage VOF1 generated by the DAC 2027a and the digital offset data DOF1 is expressed by the following formula (3).

[Formula 3]

$$DOF1 = VOF1 \div VADC \times (2^{NADC}-1) \qquad (3)$$

Also, since the relationship between the setting code S1 of the DAC 2027a and the analog offset voltage VOF1 generated by the DAC 2027a is expressed by the above-mentioned formula (2), the relationship between the setting code S1 of the DAC 2027a and the digital offset data DOF1 is expressed by the following formula (4).

[Formula 4]

$$DOF1 = VDAC \times S1 \div (2^{N1}-1) \div VADC \times (2^{NADC}-1) \qquad (4)$$

Note that the zero level controller 2027b may output, to the subtractor SU1, digital offset data obtained by subtracting a predetermined value, which corresponds to electrical characteristics of the ADC 2024, noise generated in the AFE circuit 202 and the like, from the digital offset data DOF1 corresponding to the analog offset voltage VOF1 generated by the DAC 2027a.

In the AFE circuit 202 structured in the above-described manner, the analog offset voltage VOF1 generated by the DAC 2027a is added to the analog image signal in the previous stage of the ADC 2024, and the digital offset data DOF1 output from the zero level controller 2027b are subtracted from the digital image data at in the subsequent stage of the ADC 2024, and thus digital image data of 11 bits can be obtained.

The digital image data of 11 bits obtained in the above-described manner are input to the digital offset correcting unit 2025 at the subsequent stage. The digital offset correcting unit 2025 performs digital offset correction in such a manner that the digital image data output from the ADC 2024 and corresponding to the dark period analog image signal reach a predetermined level.

Figure 10:
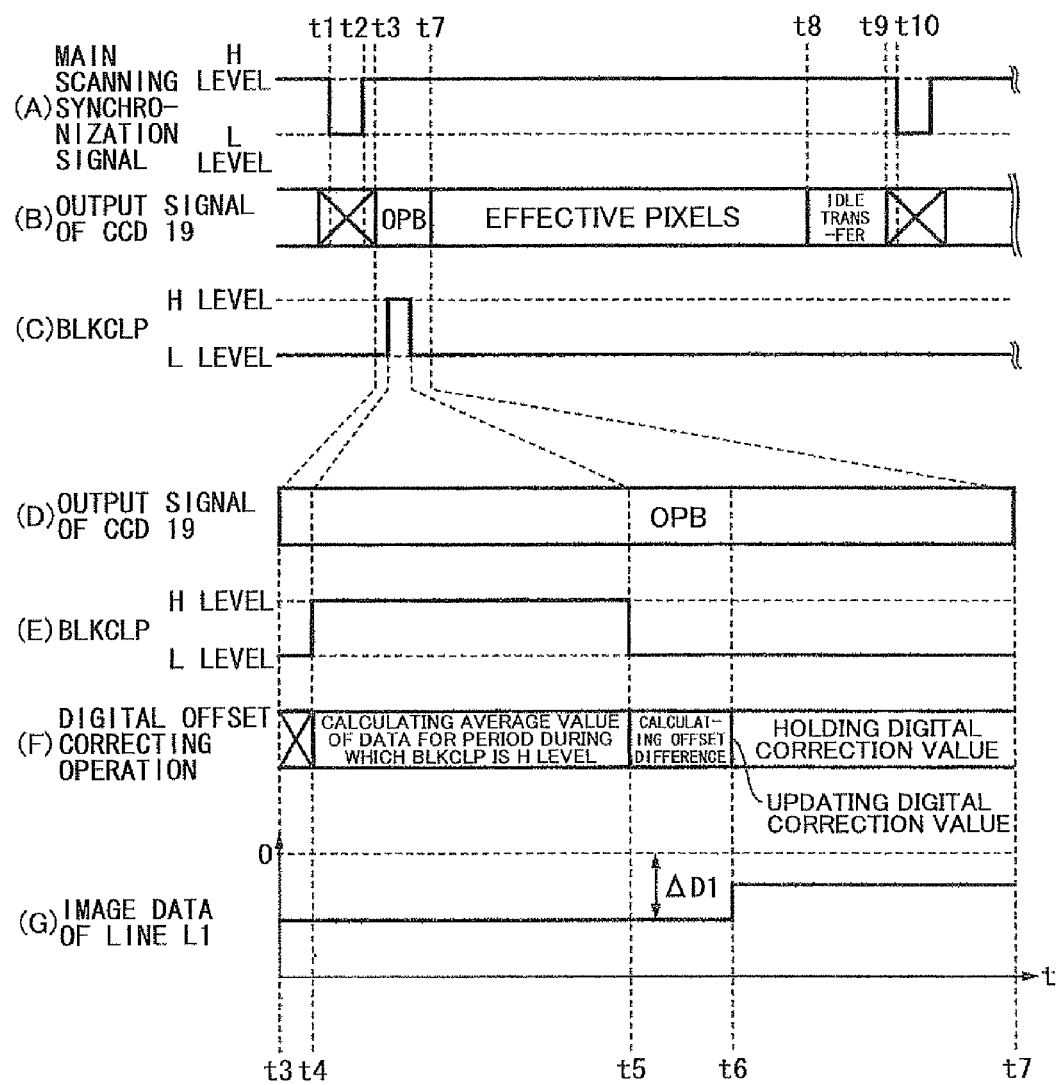
FIG. 10 is a timing chart for when a digital offset correcting unit 2025 of FIG. 3 performs digital offset correction based on digital image data of a line L1.
Figure 11:
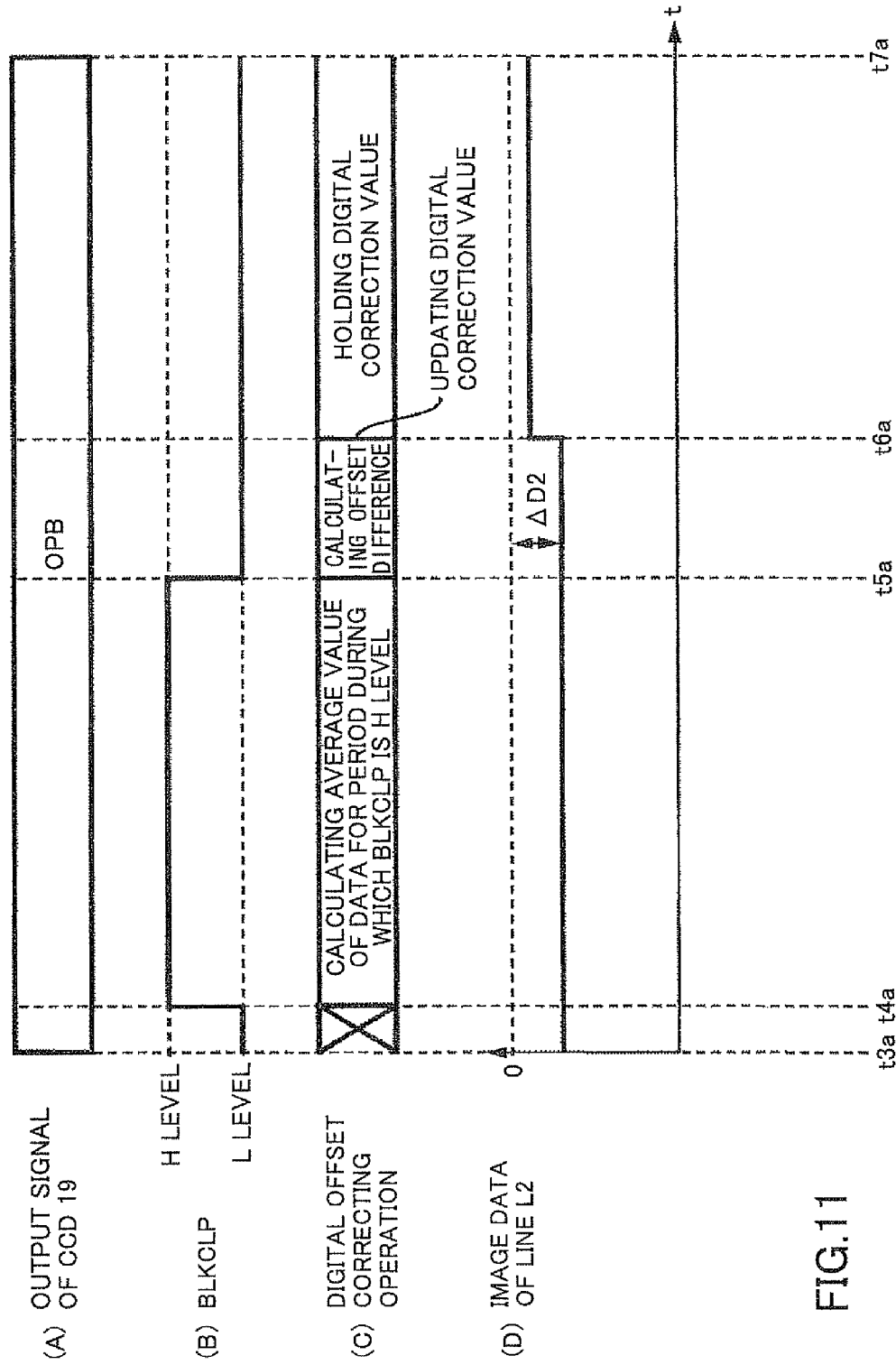
FIG. 11 is a timing chart for when the digital offset correcting unit 2025 of FIG. 3 performs digital offset correction based on digital image data of a line L2.
Figure 12:
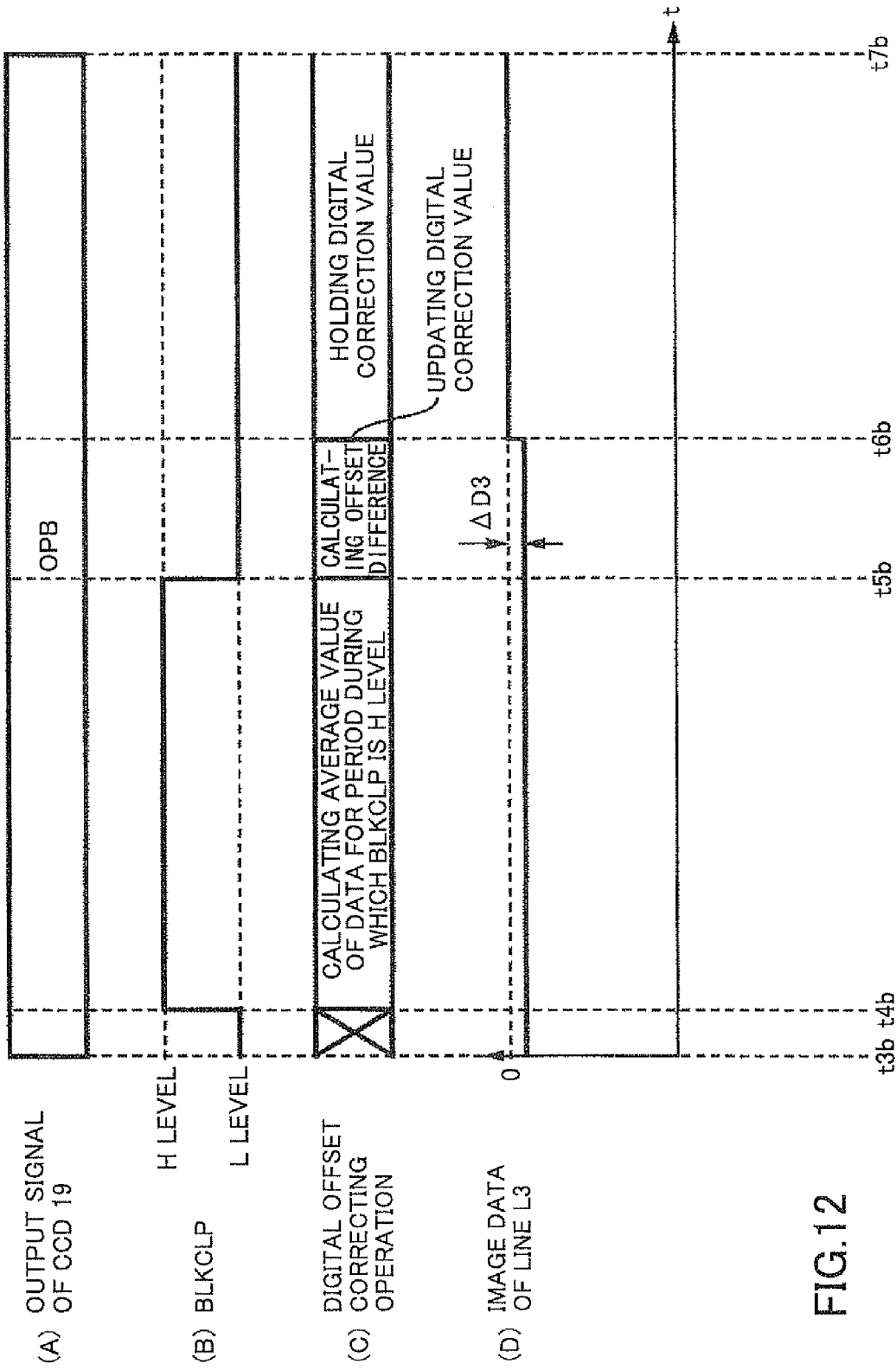
FIG. 12 is a timing chart for when the digital offset correcting unit 2025 of FIG. 3 performs digital offset correction based on digital image data of a line L3.

FIG. 10 is a timing chart for when the digital offset correcting unit 2025 of FIG. 3 performs digital offset correction based on digital image data of a line L1. FIG. 11 is a timing chart for when the digital offset correcting unit 2025 of FIG. 3 performs digital offset correction based on digital image data of a line L2. FIG. 12 is a timing chart for when the digital offset correcting unit 2025 of FIG. 3 performs digital offset correction based on digital image data of a line L3. The lines L1, L2 and L3 are read by the image processing apparatus 10 during a continuous main scanning line period. With reference to FIGS. 10 to 12, the digital offset correction is explained.

In FIG. 10, the period from a time t1 to a time t10 is a main scanning line period. The period from a time t3 to a time t7 is an OPB pixel transfer period, the period from the time t7 to a time t8 is an effective pixel transfer period, and the period from the time t8 to a time t9 is an idle transfer period. The digital offset correction is performed during the OPB pixel transfer period spanning from the time t3 to the time t7. In a period from a time t4 to a time t5 within the OPB pixel transfer period, the black clamping signal BLKCLP becomes H level. During this period, the digital image data corresponding to the dark period analog image signal are input to the averaging unit 2025b, and the averaging unit 2025b calculates an average value DAVE of the input digital image data, as shown in FIG. 10(F), and outputs the average value DAVE to the correction calculating unit 2025a.

Subsequently, during the period from the time t5 to a time t6, the correction calculating unit 2025a calculates a difference D1 (=DAVE−TG) between the average value DAVE and a target value TG (for example, 0). Then, at the time t6, the correction calculating unit 2025a sets a digital correction value DOFS in the following manner and outputs the digital correction value DOFS to the adder AD2.

(1) when D1>0, the digital correction value DOFS is set to $(-1) \times D1 \times \beta$
(2) when D1<0, the digital correction value DOFS is set to $(-1) \times D1 \times \beta$
(3) when D1=0, the digital correction value DOFS is set to 0

Here, a coefficient β is a constant equal to or greater than 0 and equal to or less than 1. By multiplying the difference D1 by the coefficient β, the difference D1 is not corrected at once but is corrected multiple times. The target value TG and the coefficient β are written to the register 2025c by the CPU 215 via the CPU interface 2028, and the correction calculating unit 2025a performs the above-mentioned processing by reading the target value TG and the coefficient β from the register 2025c. That is, it is possible to set the target value TG and the coefficient β to given values.

Subsequently, the adder AD2 adds the digital image data input from the subtractor SU1 to the digital correction value DOFS input from the correction calculating unit 2025a, and outputs the resultant to the offset adding unit 2026 and the averaging unit 2025b. Since the digital correction value DOFS is set in the above-described manner, when the difference D1 is a positive value, a value equal to the coefficient β times the difference D1 is subtracted from the digital image data. On the other hand, when the difference D1 is a negative value, the value equal to the coefficient β times the difference D1 is added to the digital image data. At the time t6, the digital correction value DOFS is updated, and accordingly, the digital image data value is changed as shown in FIG. 10(G). Since the digital correction value DOFS is the coefficient β times the difference D1, the digital image data value is not corrected before reaching zero. Then, during the period from the time t6 to the time t7, the correction calculating unit 2025a holds the updated digital correction value DOFS.

FIG. 11 shows an OPB pixel transfer period in a main scanning line period subsequent to the main scanning line period of FIG. 10. Also in the OPB pixel transfer period of FIG. 11, operations the same as those performed in the OPB pixel transfer period of FIG. 10 are performed and digital image data value is corrected.

FIG. 12 shows an OPB pixel transfer period in a main scanning line period subsequent to the main scanning line period of FIG. 11. Also in the OPB pixel transfer period of FIG. 12, operations the same as those performed in the OPB pixel transfer period of FIG. 11 are performed and digital image data value is corrected.

Figure 13:
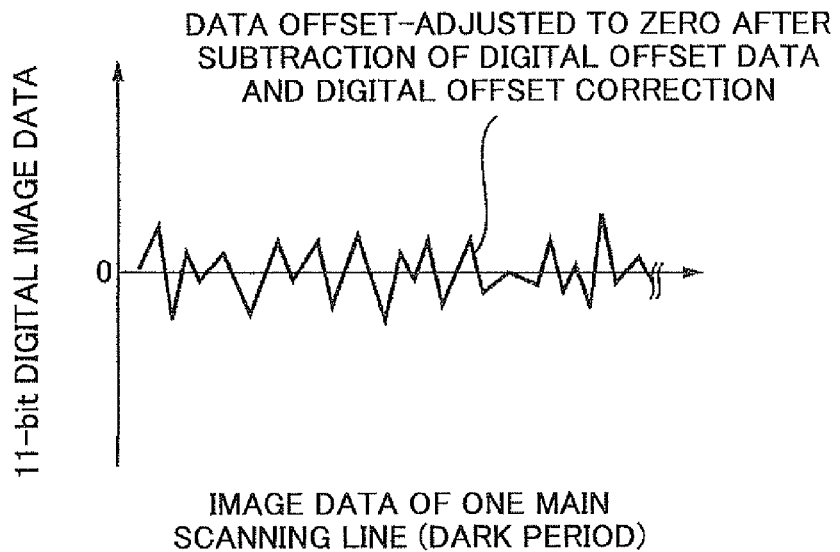
FIG. 13 is a graph showing digital image data input from the digital offset correcting unit 2025 to an offset adding unit 2026.

If the above-mentioned digital offset correction is performed for each main scanning line period, the digital image data input from the digital offset correcting unit 2025 to the offset adding unit 2026 always have a value close to the target value TG of zero. FIG. 13 is a graph showing the digital image data input from the digital offset correcting unit 2025 to the offset adding unit 2026. As shown in FIG. 13, the value of the digital image data input to the offset adding unit 2026 is adjusted to be close to zero. That is, the correction is performed in such a manner that the black offset level becomes the target value TG.

The offset adding unit 2026 adds predetermined digital offset data DOF2 set by the CPU 215 via the CPU interface 2028 to the digital image data input to the offset adding unit 2026, and outputs the resultant to the signal processing unit 21 via the interface unit 205. The digital offset data DOF2 added by the offset adding unit 2026 has such a value that the digital image data after the addition, including a random noise component, is equal to or greater than 0. Accordingly, the digital image data output from the offset adding unit 2026 always has a positive value, and therefore, the sign bit becomes insignificant. For this reason, the offset adding unit 2026 outputs the digital image data of 10 bits without a sign bit.

Figure 14:
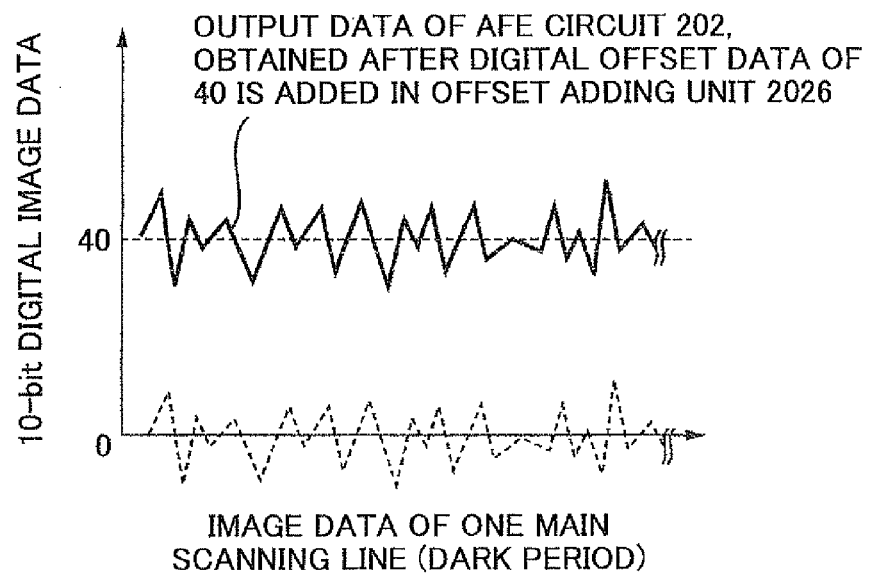
FIG. 14 is a graph showing digital image data formed by the offset adding unit 2026 adding digital offset data DOF2 to the digital image data input from the digital offset correcting unit 2025.

FIG. 14 is a graph showing the digital image data formed by the offset adding unit 2026 adding the digital offset data DOF2 to the digital image data input from the digital offset correcting unit 2025. As shown in FIG. 14, by the offset adding unit 2026, the digital offset data DOF2 of 40 is added to the digital image data input from the digital offset correcting unit 2025, shown by the dashed line, thus generating 10-bit digital image data, shown by the solid line, which digital image data are final output data of the AFE circuit 202.

As described above, according to the first embodiment, when an original image read by the CCD 19 is signal-processed in the AFE circuit 202, the predetermined analog offset voltage VOF1 is applied in the previous stage of the ADC 2024 of the AFE circuit 202. Herewith, it is possible to prevent the analog image signal from falling below the lower limit voltage of the dynamic range of the ADC 2024 in the previous stage of the ADC 2024.

In addition, according to the first embodiment, in the subsequent stage of the ADC 2024, the digital offset data DOF1 corresponding to the analog offset voltage VOF1 applied in the previous stage of the ADC 2024, or digital offset data equal to or less than the digital offset data DOF1 are subtracted from the digital image data output from the ADC 2024, and then the black offset level is corrected in the subsequent digital offset correction so as to be the target value TG. Accordingly, it is possible to prevent a density difference in an image, involved with a large change in the analog offset voltage VOF1 due to the influence of the DNL error of the DAC 2027a, and eliminate the necessity for the DAC 2027a to have a wide dynamic range and high resolution. As a result, the chip area as well as cost can be reduced compared to the conventional technology.

Furthermore, according to the first embodiment, the target value TG and the coefficient β of the digital offset correction and the digital offset data DOF2 added by the offset adding unit 2026 can be set to given values from the CPU 215 via the CPU interface 2028. As a result, it is possible to adjust the black offset level in accordance with the amount of noise specific to the image processing apparatus 10.

In addition, according to the first embodiment, the analog offset voltage VOF1 applied in the previous stage of the ADC 2024 can be set from the CPU 215 via the CPU interface 2028. Therefore, it is possible to add a sufficient amount of analog offset voltage VOF1 to the analog image signal, which prevents senseless narrowing of the dynamic range of the ADC 2024. Also, the DAC 2027a in this case does not need to have fine resolution, which leads to a reduction in cost.

Second Embodiment

Figure 15:
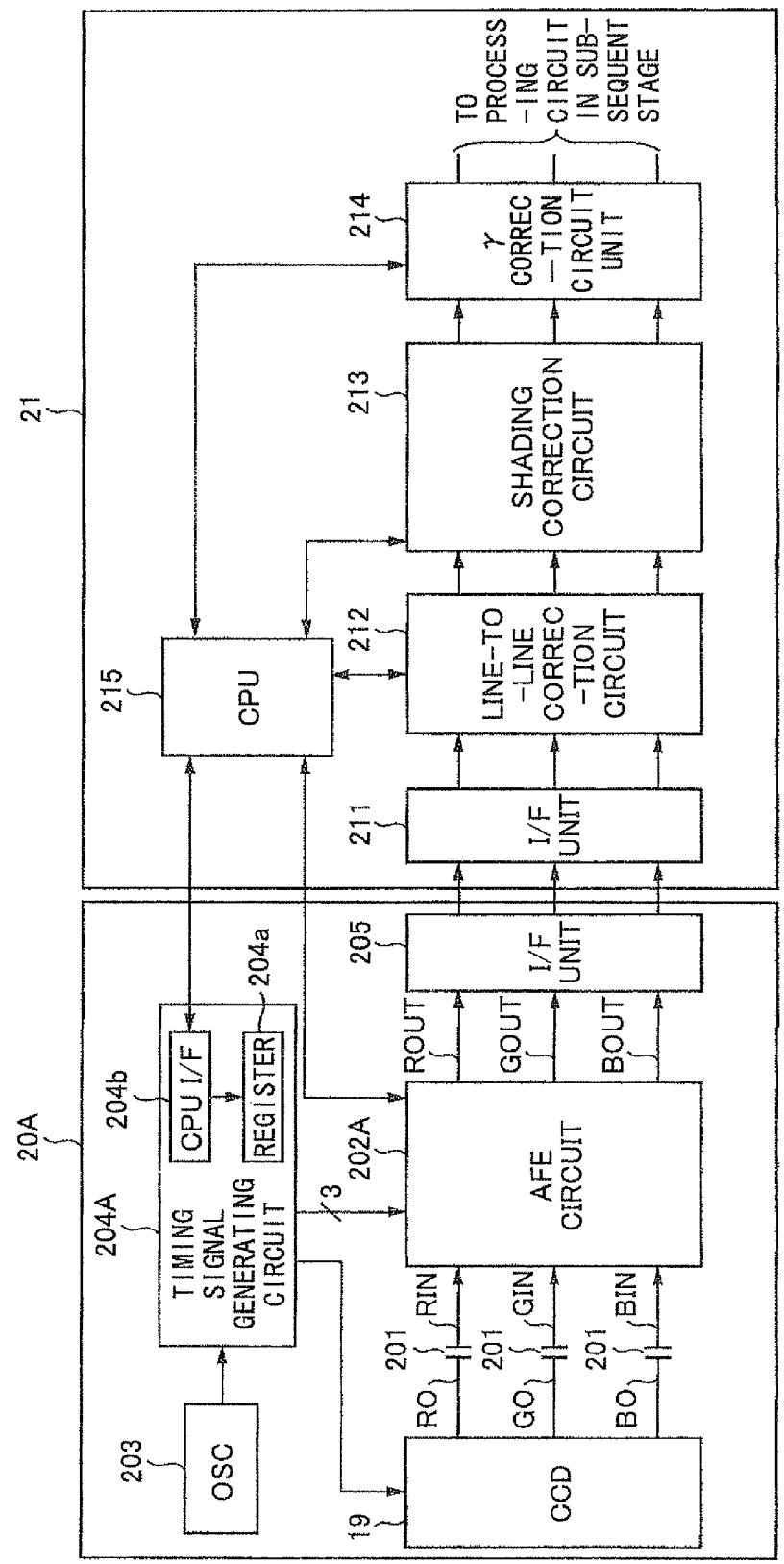
FIG. 15 is a block diagram showing structures of a sensor board 20A and the signal processing unit 21 of an image processing apparatus according to a second embodiment.

FIG. 15 is a block diagram showing structures of a sensor board 20A and the signal processing unit 21 of an image processing apparatus according to a second embodiment. Compared to the sensor board 20 of FIG. 2, the sensor board 20A of FIG. 15 is characterized by having a timing signal generating circuit 204A in place of the timing signal generating circuit 204 and having an AFE circuit 202A in place of the AFE circuit 202, but the rest of the structure is the same as that of the sensor board 20 of FIG. 2. Compared to the timing signal generating circuit 204, the timing signal generating circuit 204A is characterized by further outputting an update signal UPDATA to the AFE circuit 202A.

Figure 16:
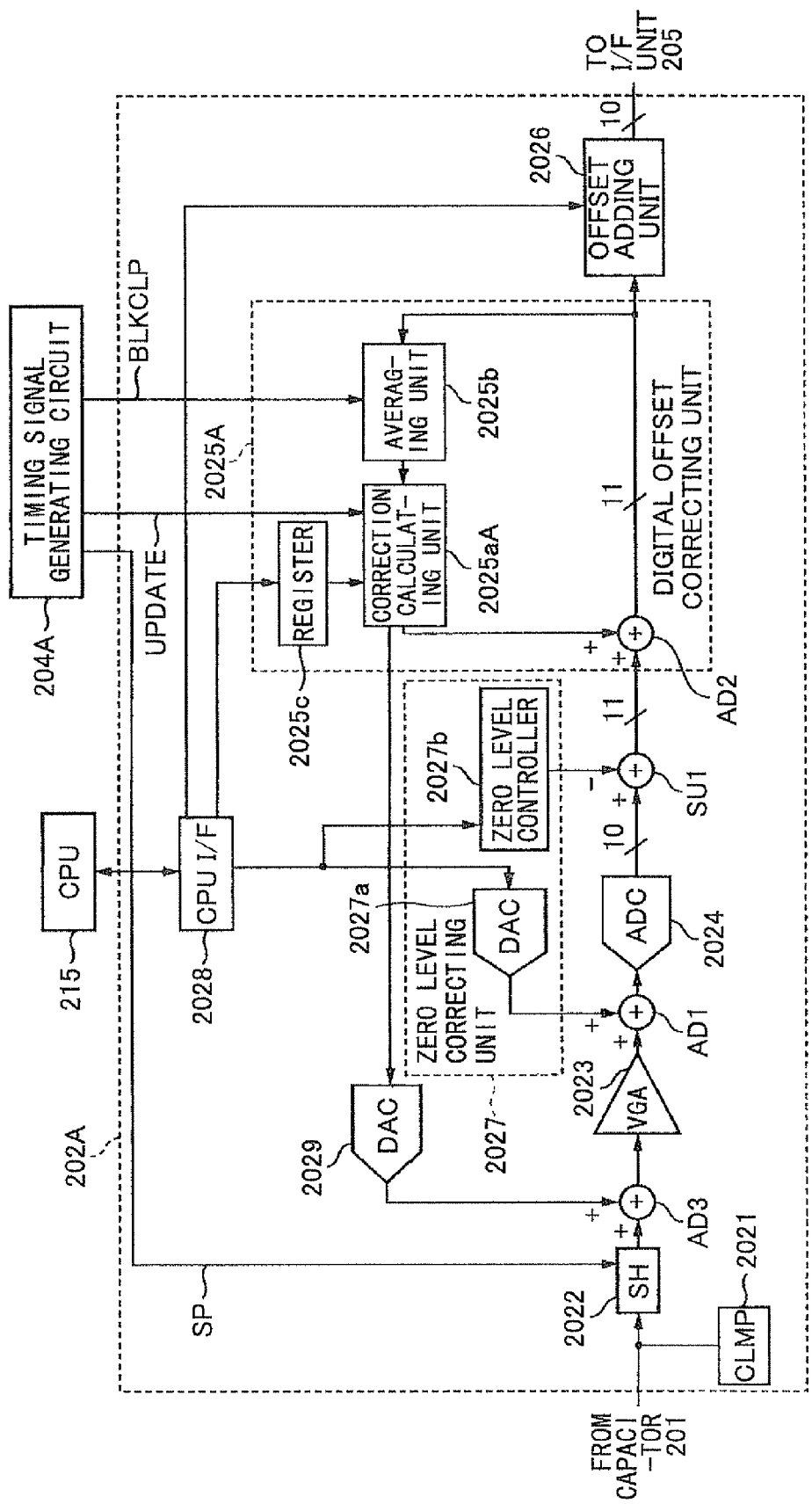
FIG. 16 is a block diagram showing a structure of an AFE circuit 202A of FIG. 15.

FIG. 16 is a block diagram showing a structure of the AFE circuit 202A of FIG. 15. Compared to the AFE circuit 202 of FIG. 3, the AFE circuit 202A of FIG. 16 is characterized by having a digital offset correcting unit 2025A in place of the digital offset correcting unit 2025, having a DAC 2029, and further having an adder AD3 for applying an analog offset voltage VOF2 generated by the DAC 2029 to the analog image signal input to the amplifier 2023, but the rest of the structure is the same as that of the AFE circuit 202 of FIG. 3. Here, the DAC 2029 and the adder AD3 make up a first conversion and addition unit, and the DAC 2027a and the adder AD1 make up a second conversion and addition unit. The zero level controller 2027b and the subtractor SU1 make up a control subtraction unit. The image processing apparatus of the second embodiment is characterized by that, when a digital correction value of the digital offset correcting unit 2025A reaches or exceeds a predetermined threshold TH1, the analog offset voltage VOF2 generated by the DAC 2029 is applied to the analog image signal input to the amplifier 2023.

As shown in FIG. 16, in the AFE circuit 202A, the analog offset voltage VOF1 from the DAC 2027a is applied to the analog image signal input to the ADC 2024, the digital offset data DOF1 from the zero level controller 2027b is subtracted from the digital image data output from the ADC 2024, and subsequently a digital offset correction is performed at the digital offset correcting unit 2025A. However, if the analog offset voltage VOF1 applied to the analog image signal input to the ADC 2024 is high, the dynamic range of the ADC 2024 narrows by an amount corresponding to the voltage applied. Therefore, it is preferable not to make the analog offset voltage VOF1 applied to the analog image single input to the ADC 2024 unnecessarily high.

Given this factor, the analog offset voltage VOF1 generated by the DAC 2027a is set to the minimum necessary, i.e., a voltage which does not cause saturation by using only the noise component of the analog image signal as the input signal of the ADC 2024. In this case, when the digital offset correcting unit 2025A performs digital offset correction, if the offset voltage caused by leakage current occurring at an input unit, such as the clamping circuit 2021, of the AFE circuit 202A and the offset voltage occurring inside of the AFE circuit 202A are high, the digital correction value DOFS becomes large. Also, in some cases, due to these offset voltages, the analog image signal input to the ADC 2024 may be saturated. Accordingly, in the case when the digital correction value DOFS reaches the predetermined threshold TH1 or more, the analog offset voltage VOF2 is applied to the analog image signal using the DAC 2029 other than the DAC 2027a. Herewith, the digital correction value DOFS is reduced by an amount corresponding to the analog offset voltage VOF2, and the digital correction value DOFS is updated to be equal to or less than the threshold TH1.

Next is described a change in the digital image data output from the ADC 2024 when a setting code S2 of the DAC 2029 is changed by only 1 with the condition in which the dynamic range of the DAC 2029 is VDAC2 [V], the resolution of the DAC 2029 is N2 bits (for example, 4 bits), and the gain of the amplifier 2023 is a [times]. A voltage V1 [V] that is a change in the output voltage of the DAC 2029, which change is made when the setting code S2 of the DAC 2029 is changed by only 1, is expressed by the following formula (5).
[Formula 5]

$$V1 = VDAC2 \div (2^{N2} - 1) \quad (5)$$

When being amplified by the amplifier 2023 and input to the ADC 2024, the voltage V1 becomes a voltage V2 [V] expressed by the following formula (6).
[Formula 6]

$$V2 = V1 \times \alpha = VDAC2 \div (2^{N2} - 1) \times \alpha \quad (6)$$

Furthermore, the voltage V2 is converted to digital data by the ADC 2024. The digital data value is the threshold TH1 mentioned above. The threshold TH1 is expressed by the following formula (7).
[Formula 7]

$$TH1 = V2 \div VADC \times (2^{NADC} - 1) = (VDAC2 \div (2^{N2} - 1) \times \alpha) \div VADC \times (2^{NADC} - 1) \quad (7)$$

The correction calculation unit 2025aA calculates the digital correction value DOFS in a similar fashion as the above-mentioned correction calculating unit 2025a and outputs the digital correction value DOFS to the adder AD2. If the digital correction value DOFS is equal to or greater than the threshold TH1, the correction calculating unit 2025aA increases the setting code S2 of the DAC 2029 by only 1 so that the digital correction value DOES is reduced by the threshold TH1. As explained with reference to Formulae (5) to (7), the value of the threshold TH1 corresponds to the amount of change in the setting code S2 of the DAC 2029. In this case also, in order to make the resolution of the DAC 2027a fine, if the balance between the analog offset voltage VOF2 generated by the DAC 2029 and the digital correction value DOFS output from the correction calculating unit 2025aA is disrupted at a timing when the setting code S2 of the DAC 2029 is changed, the black offset level of the digital image data output from the digital offset correcting unit 2025A may be disturbed. Given this factor, the correction calculating unit 2025aA responds to the update signal UPDATE output from the timing signal generating circuit 204A during a period other than the image reading period and compares the digital correction value DOFS to the threshold TH1. If the digital correction value DOFS is equal to or greater than the threshold TH1, the correction calculating unit 2025aA performs updates of the setting code S2 of the DAC 2029 and the digital correction value DOFS.

Note that the timing signal generating circuit 204A outputs the update signal UPDATE based on information written to the register 204a by the CPU 215 via the CPU interface 204b, and therefore, the timing at which the update signal UPDATE is output is adjustable. In addition, the timing signal generating circuit 204A is able to output the update signal UPDATE not only during the period other than the image reading period mentioned above, but also during the OPB pixel transfer period, the effective pixel transfer period or the idle transfer period.

As described above, according to the second embodiment of the present invention, the same effect as in the first embodiment can be achieved. In addition, in the case when the digital correction value DOFS calculated by the correction calculating unit 2025aA reaches the threshold TH1 or more, the analog offset voltage VOF2 is applied to the analog image signal using the DAC 2029 other than the DAC 2027a, and thereby the digital correction value DOFS is reduced by an amount corresponding to the analog offset voltage VOF2. Accordingly, it is possible to correct a large deviation of the black offset level without narrowing the dynamic range of the ADC 2024.

Figure 30:
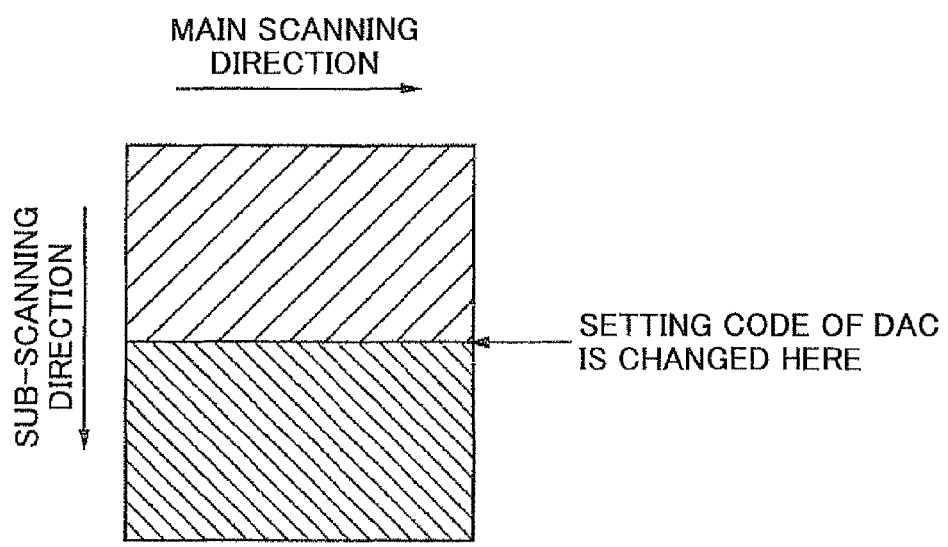
FIG. 30 shows an example of a read image in the case where there is a change in the setting code of the DAC 553 of FIG. 27 during image reading.

Furthermore, according to the second embodiment, if the update of the setting code S2 of the DAC 2029 is performed during the image reading period, a difference in density, as shown in FIG. 30, may be created. In view of this problem, the timing signal generating circuit 204A outputs the update signal UPDATE during a period other than the image reading period, and the correction calculating unit 2025aA responds to the update signal UPDATE and performs updates of the setting code S2 of the DAC 2029 and the digital correction value DOFS. As a result, it is possible to obtain a read image with stable density.

Third Embodiment

Figure 17:
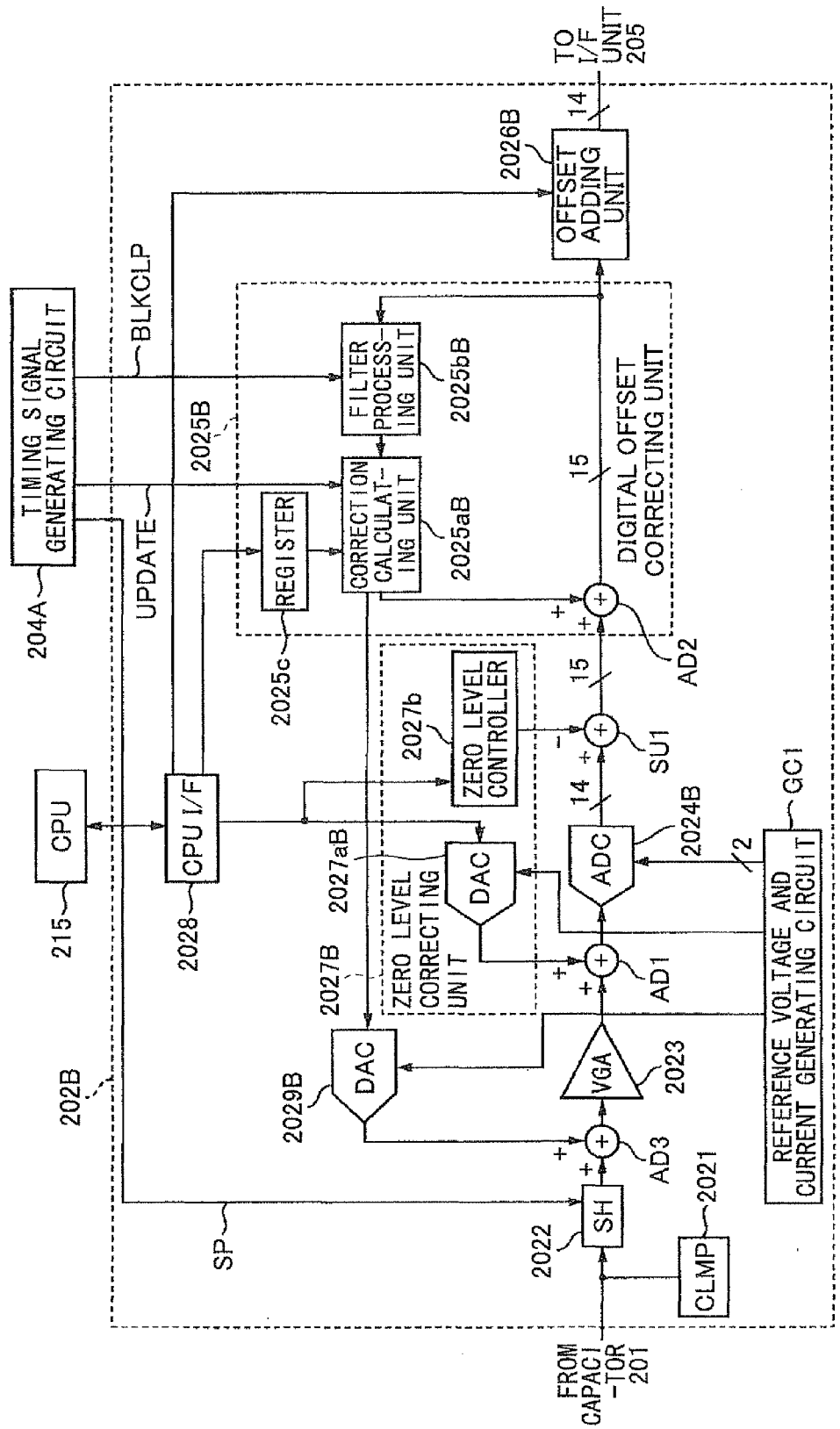
FIG. 17 is a block diagram showing a structure of an AFE circuit 202B according to a third embodiment.

FIG. 17 is a block diagram showing a structure of an AFE circuit 202B according to a third embodiment. Compared to the AFE circuit 202A of FIG. 16, the AFE circuit 202B of FIG. 17 is characterized by having an ADC 2024B in place of the ADC 2024, having a digital offset correcting unit 2025B in place of the digital offset correcting unit 2025A, having an offset adding unit 2026B in place of the offset adding unit 2026, having a zero level correcting unit 2027B in place of the zero level correcting unit 2027, having a DAC 2029B in place of the DAC 2029, further including a reference voltage and current generating circuit GC1, and handling digital image data of 14 bits and 15 bits, but the rest of the structure is the same as that of the AFE circuit 202A of FIG. 16.

An image processing apparatus according to the third embodiment includes an amplifier 2023 for, during the main scanning line period, amplifying an analog image signal input from the CCD 19 and outputting the amplified analog image signal; an ADC 2024B for analog/digital-converting the analog image signal input from the amplifier 2023 to digital image data and outputting the digital image data; and a digital offset correcting unit 2025B for performing a low-pass filter calculation based on the digital image data output from the ADC 2024B, calculating, based on the average value, the digital correction value DOFS used for correcting the digital image data so as to obtain a desired black offset level, and performing correction on the digital image data using the digital correction value DOFS. In the image processing apparatus, the digital offset correcting unit 2025B is characterized by, first, comparing the digital correction value DOFS to the predetermined threshold TH1, reducing the digital correction value DOFS to be equal to or less than the threshold TH1 if the digital correction value DOES is equal to or greater than the threshold TH1 and updating the digital correction value DOFS, and subsequently performing the low-pass filter calculation based on the digital image data and calculating the digital correction value DOFS.

Compared to the offset adding unit 2026 of FIG. 16, the offset adding unit 2026B of FIG. 17 is characterized by adding the digital offset data DOF2 set by the CPU 215 via the CPU interface 2028 to the input digital image data of 15 bits, thereby outputting 14-bit digital image data.

Compared to the ADC 2024 of FIG. 16, the ADC 2024B of FIG. 17 is characterized by receiving the lower limit voltage and upper limit voltage of the dynamic range of the input signal from the reference voltage and current generating circuit GC1 and outputting the 14-bit digital image data.

Compared to the zero level correcting unit 2027 of FIG. 16, the zero level correcting unit 2027B of FIG. 17 is characterized by including a DAC 2027aB in place of the DAC 2027a. Compared to the DAC 2027a, the DAC 2027aB is characterized in that the resolution is, for example, 4 bits and the dynamic range of the output voltage is determined by a current input from the reference voltage and current generating circuit GC1. The relationship between the setting code S1 of the DAC 2027aB and the analog offset voltage VOF1 output from the DAC 2027aB is expressed by the formula (2) mentioned above. The setting code S1 is determined by a method similar to that described above in the first embodiment.

Compared to the digital offset correcting unit 2025A of FIG. 16, the digital offset correcting unit 2025B of FIG. 17 is characterized by including a filter processing unit 2025bB and a correction calculating unit 2025aB in place of the averaging unit 2025b and the correction calculating unit 2025aA and handling 15-bit digital image data.

The averaging unit 2025b of FIG. 16 calculates the average value DAVE of the input digital image data during the period in which the black clamping signal BLKCLP is at H level. On the other hand, the filter processing unit 2025bB of FIG. 17 calculates, during a period when the black clamping signal BLKCLP is at H level, a moving average value SMA by performing a low-pass filter calculation on predetermined pieces of digital image data input in the past each time the digital image data are input, and outputs the moving average value SMA to the correction calculating unit 2025aB.

Each time the moving average value SMA is input during the period in which the black clamping signal BLKCLP is at H level, the correction calculating unit 2025aB calculates the digital correction value DOFS, in the same manner as the correction calculating unit 2025aA, based on the input moving average value SMA and the target value TG stored in the register 2025c, and outputs the digital correction value DOFS to the adder AD2. Here, processing performed by the filter processing unit 2025bB and the correction calculating unit 2025aB during the period in which the black clamping signal BLKCLP is at H level is referred to as digital offset correction. In the digital offset correction, correction is made in such a manner that digital image data corresponding to the dark period analog image signal input to the digital offset correcting unit 2025B have a predetermined level. The correction calculating unit 2025aB further compares the digital correction value DOFS to the threshold TH1 described above in the second embodiment in response to the update signal UPDATE. If the digital correction value DOFS is equal to or greater than the threshold TH1, the correction calculating unit 2025aB updates the setting code S2 of the DAC 2029B in the same manner as the correction calculating unit 2025aA and also updates the digital correction value DOFS.

Compared to the DAC 2029 of FIG. 16, the DAC 2029B of FIG. 17 is characterized in that the resolution is, for example, 8 bits and the dynamic range of the output voltage is determined by a current input from the reference voltage and current generating circuit GC1.

The reference voltage and current generating circuit GC1 is formed in a single manufacturing process. Using a voltage of 1.2 V input from an external power supply (not shown), the reference voltage and current generating circuit GC1 outputs, to the ADC 2024B, a reference voltage for setting the lower limit voltage (for example, 0.775 V) and the upper limit voltage (e.g., 1.225 V) of the dynamic range of the input signal to the ADC 2024B, outputs, to the DAC 2027aB, a current (e.g., 12 µA) for setting the dynamic range (e.g., 60 mV) of the output voltage of the DAC 2027aB, and outputs, to the DAC 2029B, a current (e.g., 12 µA) for determining the dynamic range (e.g., 500 mV) of the output voltage of the DAC 2029B.

According to the third embodiment, the dynamic range of the input voltage of the ADC 2024B, the dynamic range of the output voltage of the DAC 2027aB and the dynamic range of the output voltage of the DAC 2029B are determined by the reference voltage and current generating circuit GC1. As a result, even if there is individual variability (process variability) in the reference voltage and current generating circuit GC1, the variability does not affect the relationships of the dynamic ranges. This is explained below.

Assume here that, for example, the resolution of the ADC 2024B is NADC bits and the dynamic range of the input voltage is VADC, the resolution of the DAC 2027aB is N1 bits and the dynamic range of the output voltage is VDAC1, and the resolution of the DAC 2029B is N2 bits and the dynamic range of the output voltage is VDAC 2. At this point, the voltage per unit of the data output from the ADC 2024B is $VADC \div 2^{NADC}$. When the setting code S1 of the DAC 2027aB is changed by 1, the change in the output voltage of the DAC 2027aB is $VDAC1 \div 2^{N1}$. Also, when the setting code S2 of the DAC 2029B is changed by 1, the change in the output voltage of the DAC 2029B is $VDAC2 \div 2^{N2}$. When the setting code S1 of the DAC 2027aB is changed by 1, the data output from the ADC 2024B is changed by $(VDAC1 \div 2^{N1}) \div (VADC \div 2^{NADC})$. When the setting code S2 of the DAC 2029B is changed by 1, the data output from the ADC 2024B is changed by $(VDAC2 \div 2^{N2}) \div (VADC \div 2^{NADC})$.

Assume here that the voltage and current output from the reference voltage and current generating circuit GC1 change to be α times the voltage and current originally output. At this point, the dynamic range of each of the ADC 2024B, the DAC 2027aB and the DAC 2029B is increased by α times. However, the change in the data output from the ADC 2024B when the setting code S1 of the DAC 2027aB is changed by 1 is the same as in the case described above since both the numerator and the denominator of the above formula are multiplied by α times. Furthermore, the change in the data output from the ADC 2024B when the setting code S2 of the DAC 2029B is changed by 1 is also the same as in the case described above.

That is, even if there is variability in the voltage and current output from the reference voltage and current generating circuit GC1, as for the digital image data output from the ADC 2024B, the setting code S1 of the DAC 2027aB and the setting code S2 of the DAC 2029B are not affected by the variability.

With reference to timing charts of FIGS. 18 to 26, next are described an update of the setting code S2 of the DAC 2029B and digital offset correction performed by the digital offset correcting unit 2025B. Here, the following cases are described:

(1) a case in which the update signal UPDATE becomes H level during an idle transfer period, and correction is made for a temperature drift in the analog image signal output from the CCD 19;

(2) a case in which the update signal UPDATE becomes H level during an effective pixel transfer period, and correction is made for a temperature drift in the analog image signal output from the CCD 19; and (3) a case in which the update signal UPDATE becomes H level during an effective pixel transfer period, and correction is made for an abrupt change in the voltage of the analog image signal caused, for example, when the power is turned on or when the gain of the amplifier 2023 is updated. Note that, as described above in the second embodiment, the timing at which the update signal UPDATE is output is adjustable.

Figure 18:
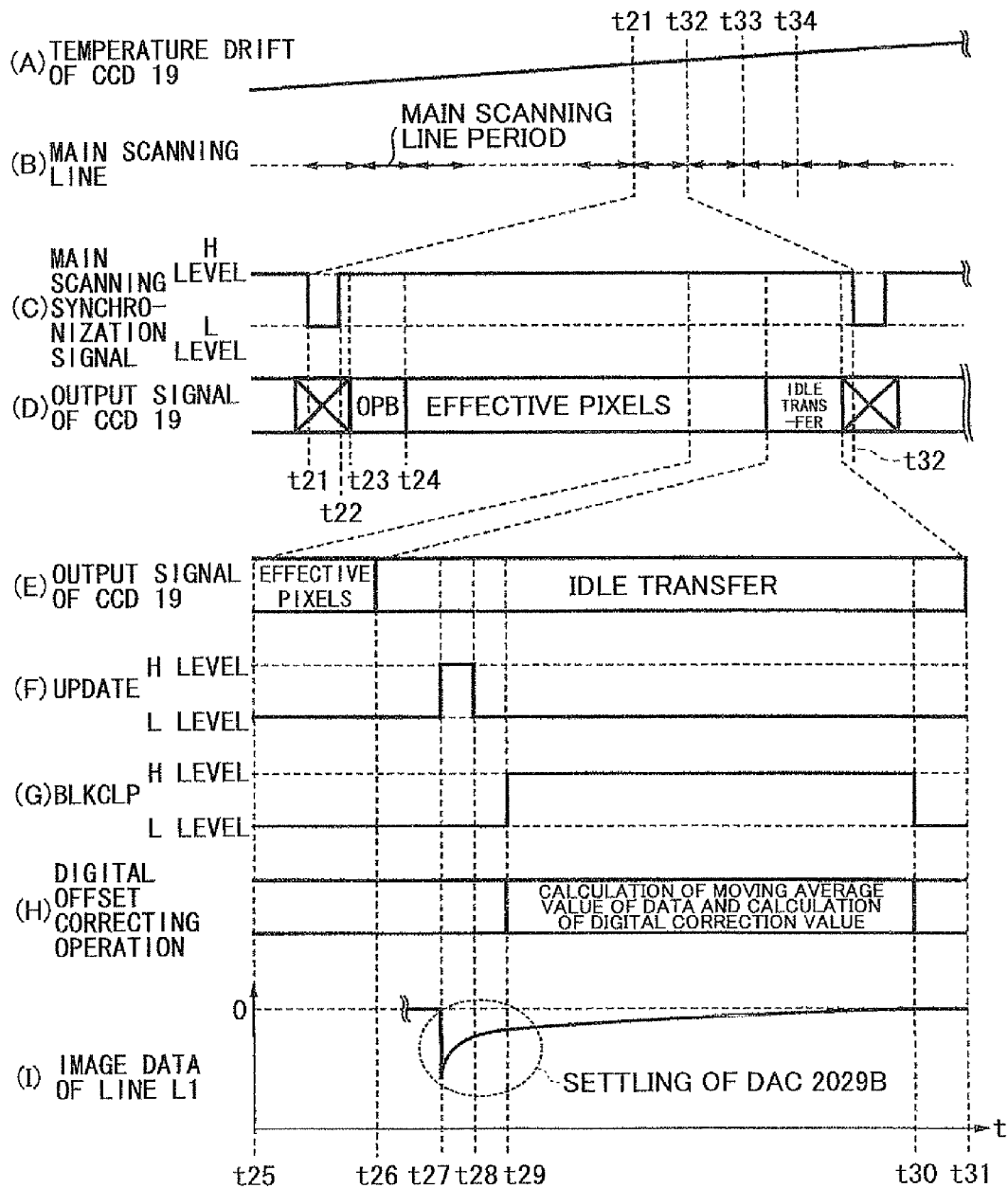
FIG. 18 is a timing chart for a digital offset correcting unit 2025B of FIG. 17 to perform digital offset correction based on the digital image data of the line L1 in the case when an update signal UPDATE becomes H level during an idle transfer period.
Figure 19:
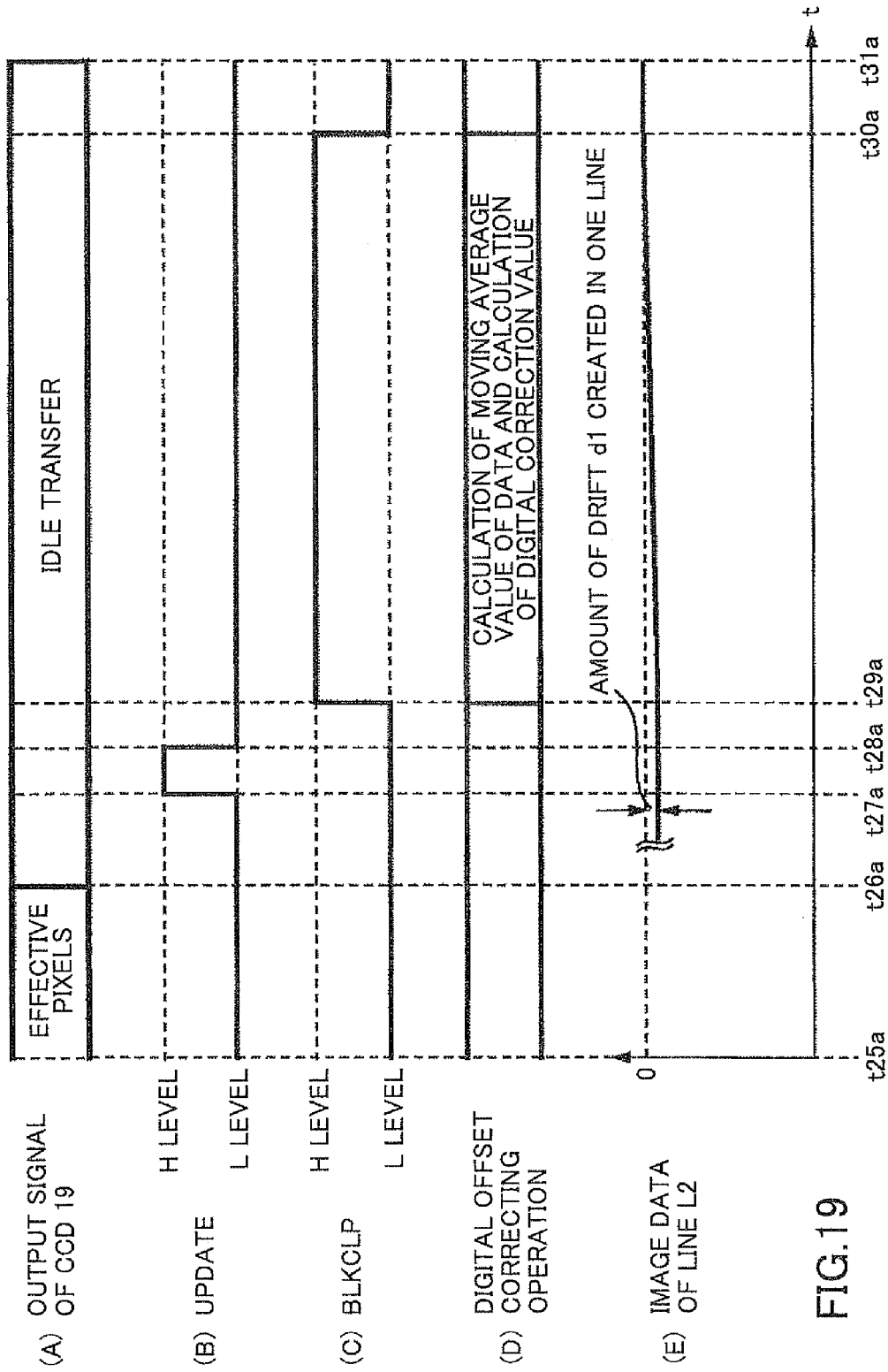
FIG. 19 is a timing chart for the digital offset correcting unit 2025B of FIG. 17 to perform digital offset correction based on the digital image data of the line L2 in the case when the update signal UPDATE becomes H level during an idle transfer period.
Figure 20:
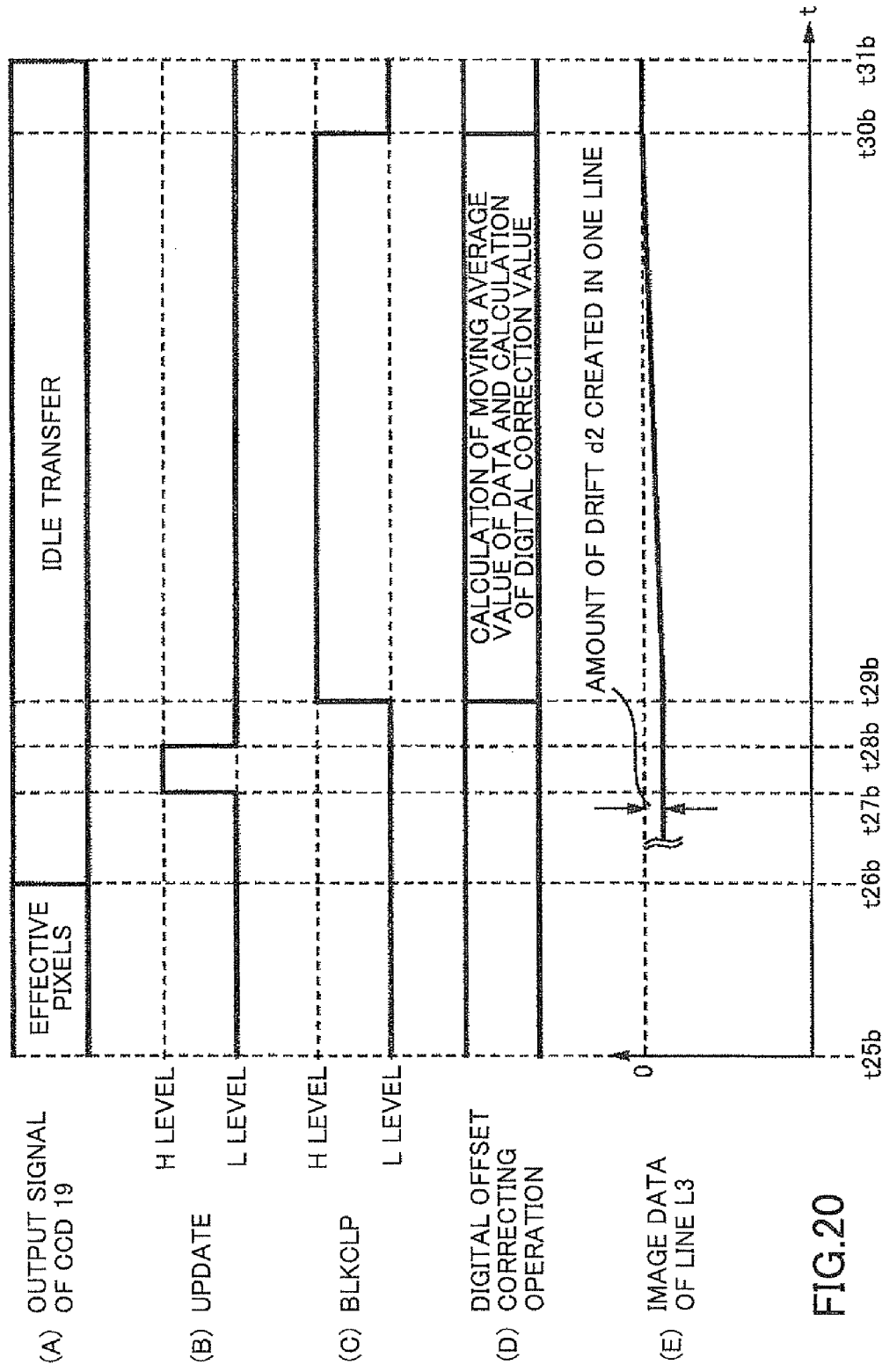
FIG. 20 is a timing chart for the digital offset correcting unit 2025B of FIG. 17 to perform digital offset correction based on the digital image data of the line L3 in the case when the update signal UPDATE becomes H level during an idle transfer period.

Here is described the above first case. FIG. 18 is a timing chart for the digital offset correcting unit 2025B of FIG. 17 to perform digital offset correction based on digital image data of the line L1 in the case when the update signal UPDATE becomes H level during an idle transfer period. FIG. 19 is a timing chart for the digital offset correcting unit 2025B of FIG. 17 to perform digital offset correction based on digital image data of the line L2 in the case when the update signal UPDATE becomes H level during an idle transfer period. FIG. 20 is a timing chart for the digital offset correcting unit 2025B of FIG. 17 to perform digital offset correction based on digital image data of the line L3 in the case when the update signal UPDATE becomes H level during an idle transfer period. The lines L1, L2 and L3 are read by the image processing apparatus of the third embodiment in a continuous main scanning line period.

In FIG. 18, the line L1 is read by the image processing apparatus of the third embodiment in a main scanning line period spanning from a time t21 to a time t32, the line L2 is read by the image processing apparatus of the third embodiment in a main scanning line period spanning from the time t32 to a time t33, and the line L3 is read by the image processing apparatus of the third embodiment in a main scanning line period spanning from the time t33 to a time t34. Within the main scanning line period spanning from the time t21 to the time t32, the period from a time t23 to a time t24 is an OPB pixel transfer period, the period from the time t24 to a time t26 is an effective pixel transfer period, and the period from the time t26 to a time t31 is an idle transfer period.

In the period from a time t27 to a time t28 within the idle transfer period, the timing signal generating circuit 204A outputs the update signal UPDATE at H level. Also, at the time t27, the correction calculating unit 2025aB calculates the digital correction value DOFS as described above based on the moving average value SMA input from the filter processing unit 2025bB and the target value TG stored in the register 2025c and compares the digital correction value DOFS to the threshold TH1. FIG. 18 shows the case in which the digital correction value DOFS is equal to or greater than the threshold TH1, and the correction calculating unit 2025aB increases the setting code S2 of the DAC 2029B by 1 and reduces the digital correction value DOFS by the threshold TH1. The update of the digital correction value DOFS is reflected immediately; however, it takes a certain amount of time for the update of the setting code of the DAC 2029B to be reflected. Therefore, as shown in FIG. 18(I), digital image data output to the offset adding unit 2026B falls off based on the update of the digital correction value DOFS at the time t27, and then, during the period between the time t27 and a time t29, gradually rises based on the setting code of the DAC 2029B. Here, the period from the time t27 to the time t29 is a settling time of the DAC 2029B.

Subsequently, during the period from a time t29 to a time t30, the timing signal generating circuit 204A outputs the black clamping signal BLKCLP at H level. Also, during the period from the time t29 to the time t30, the filter processing unit 2025bB and the correction calculating unit 2025aB respectively perform the digital offset correction described above. Herewith, the digital image data output to the offset adding unit 2026B are corrected to zero, as shown in FIG. 18(I).

Note that the timing for bringing the update signal UPDATE to the H level and the timing for bringing the black clamping signal BLKCLP to the H level are determined by information stored in the register 204b of the timing signal generating circuit 204A; however, these timings are determined also in view of the settling time of the DAC 2029B.

FIG. 19 shows a part of the effective pixel transfer period and the idle transfer period during the main scanning line period from the time t32 to the time t33 shown in FIG. 18. Note that the part of the effective pixel transfer period and the idle transfer period of FIG. 19 are periods the same as those of FIG. 18. At a time t27a of FIG. 19, the correction calculating unit 2025aB calculates the digital correction value DOFS, as described above, based on the moving average value SMA input from the filter processing unit 2025bB and the target value TG stored in the register 2025c, and compares the digital correction value DOFS to the threshold TH1. FIG. 19 shows the case in which the digital correction value DOFS is less than the threshold TH1 after the setting code S2 of the DAC 2029B and the digital correction value DOFS are updated during the idle transfer period shown in FIG. 18. Here, the setting code S2 of the DAC 2029B and the digital correction value DOFS are not updated. Subsequently, during the period from a time t29a to a time t30a, the filter processing unit 2025bB and the correction calculating unit 2025aB perform the digital offset correction described above. Herewith, as shown in FIG. 19(E), the amount of temperature drift d1 caused during the period of reading one line is corrected.

FIG. 20 shows a part of the effective pixel transfer period and the idle transfer period during the main scanning line period from the time t33 to the time t34 shown in FIG. 18. Note that the part of the effective pixel transfer period and the idle transfer period of FIG. 20 are periods the same as those of FIG. 18. During the part of the effective pixel transfer period and the idle transfer period of FIG. 20, operations the same as those performed during the part of the effective pixel transfer period and the idle transfer period of FIG. 19 are performed, and the digital image data are corrected.

According to the first case described above, the timing signal generating circuit 204A is operated in such a manner that the update signal UPDATE is brought to the H level, and then the black clamping signal BLKCLP is brought to the H level. Accordingly, a DNL error and settling error of the DAC 2029B can be corrected in the digital offset correction.

Figure 21:
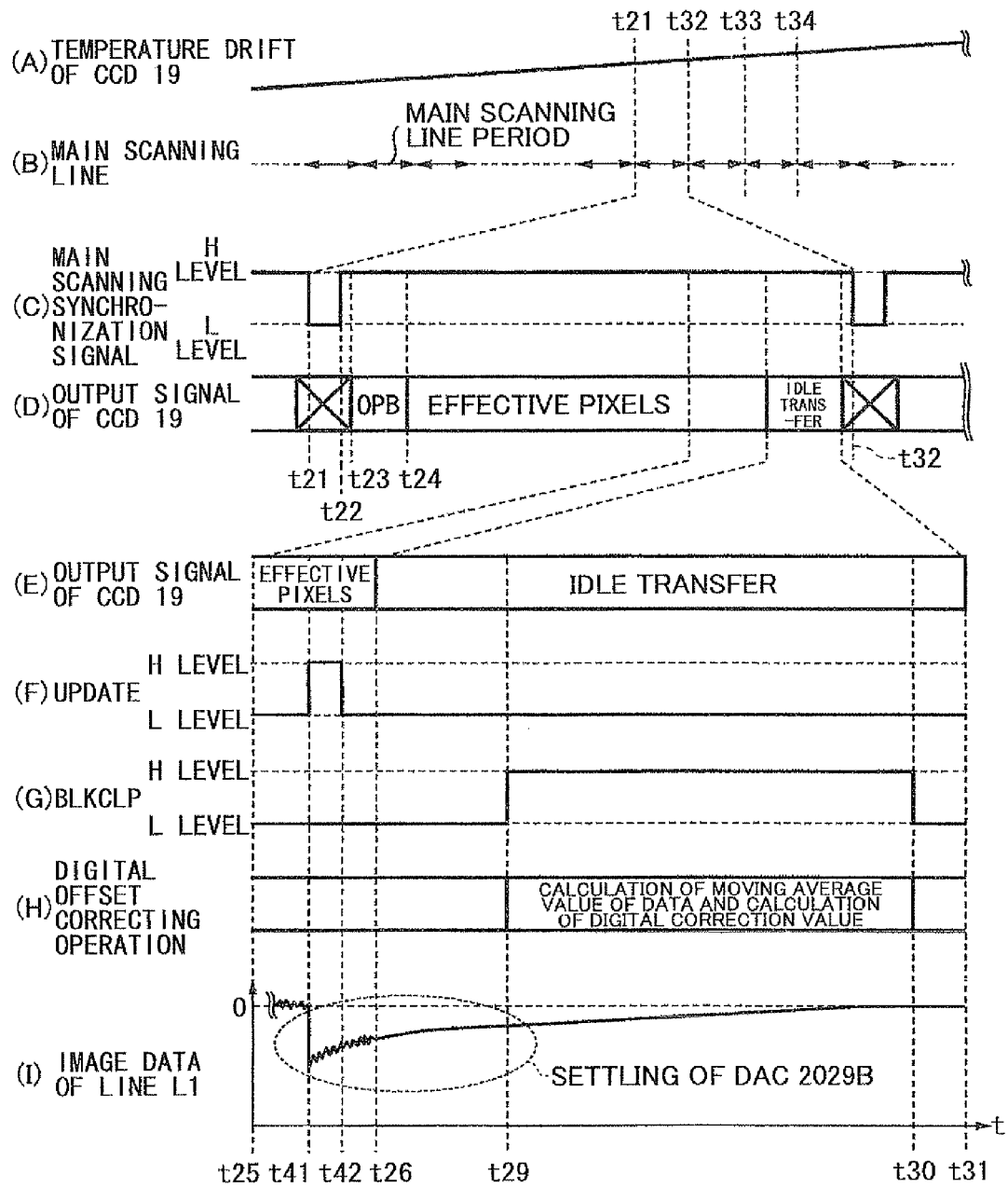
FIG. 21 is a timing chart for the digital offset correcting unit 2025B of FIG. 17 to perform digital offset correction based on the digital image data of the line L1 in the case when the update signal UPDATE becomes H level during an effective pixel transfer period.
Figure 22:
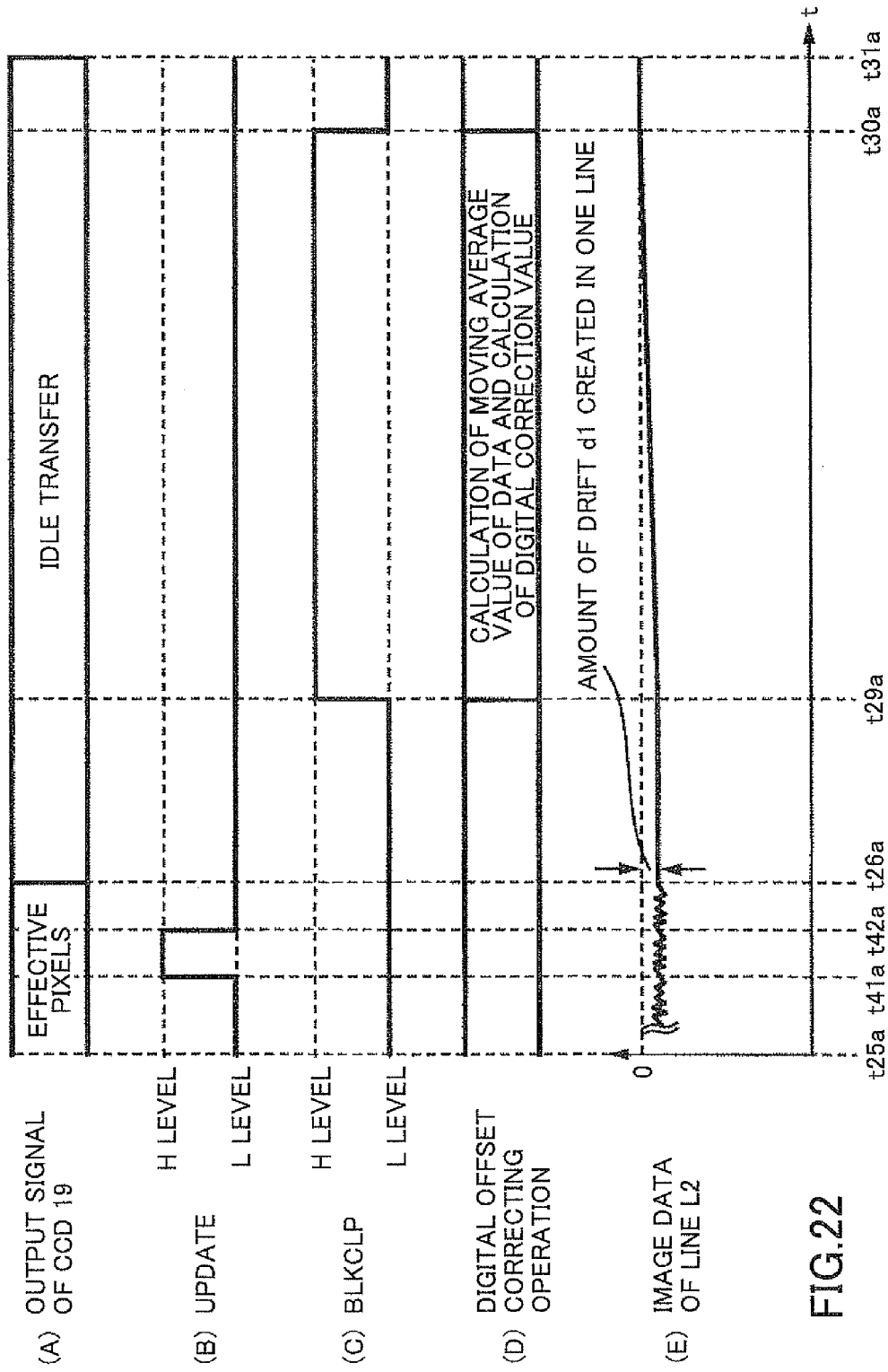
FIG. 22 is a timing chart for the digital offset correcting unit 2025B of FIG. 17 to perform digital offset correction based on the digital image data of the line L2 in the case when the update signal UPDATE becomes H level during the effective pixel transfer period.
Figure 23:
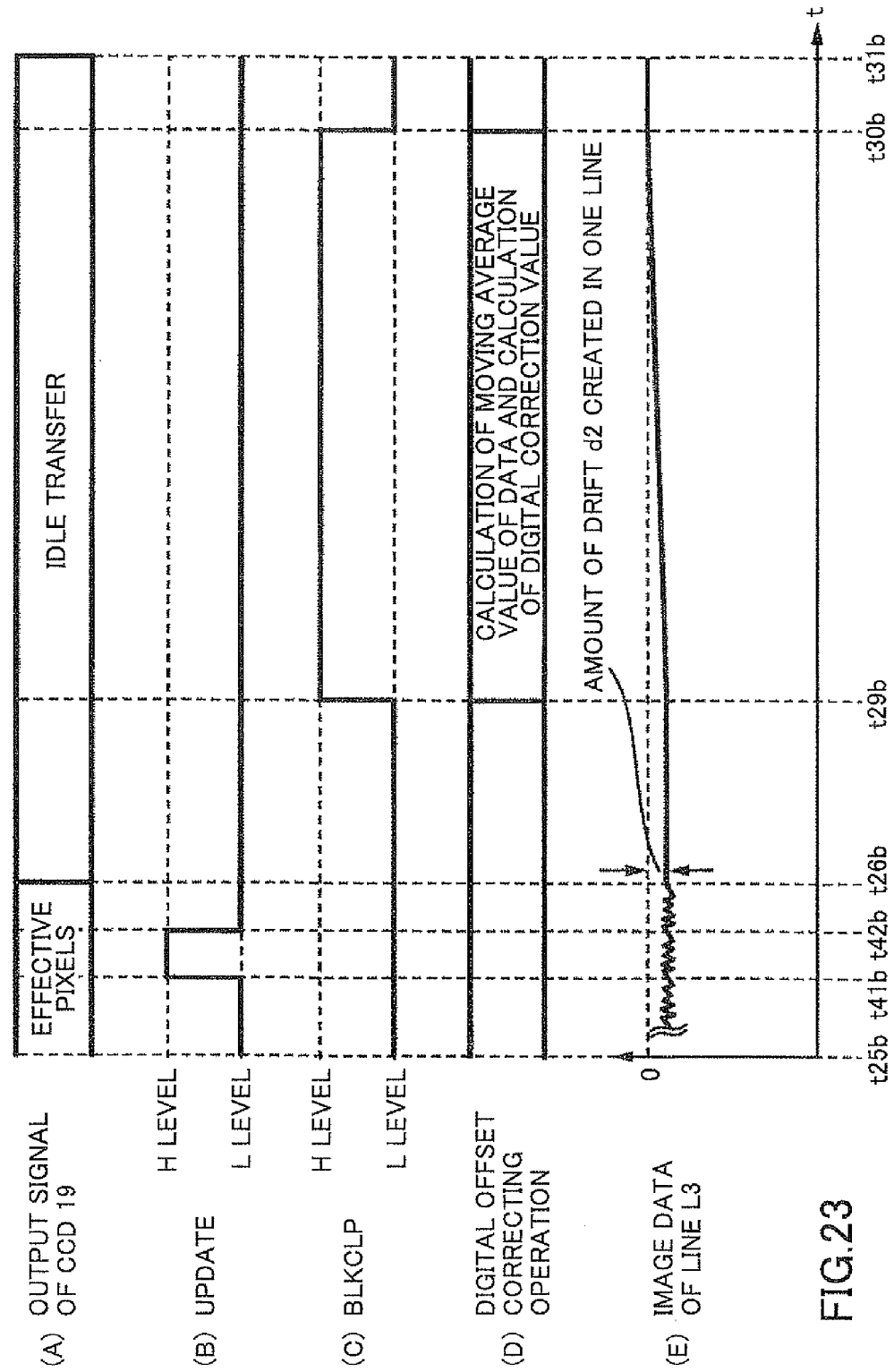
FIG. 23 is a timing chart for the digital offset correcting unit 2025B of FIG. 17 to perform digital offset correction based on the digital image data of the line L3 in the case when the update signal UPDATE becomes H level during the effective pixel transfer period.

Next is described the second case. FIG. 21 is a timing chart for the digital offset correcting unit 2025B of FIG. 17 to perform digital offset correction based on the digital image data of the line L1 in the case when the update signal UPDATE becomes H level during an effective pixel transfer period. FIG. 22 is a timing chart for the digital offset correcting unit 2025B of FIG. 17 to perform digital offset correction based on the digital image data of the line L2 in the case when the update signal UPDATE becomes H level during the effective pixel transfer period. FIG. 23 is a timing chart for the digital offset correcting unit 2025B of FIG. 17 to perform digital offset correction based on the digital image data of the line L3 in the case when the update signal UPDATE becomes H level during the effective pixel transfer period. The lines L1, L2 and L3 are read by the image processing apparatus of the third embodiment in a continuous main scanning line period.

Compared to the timing chart of FIG. 18, the timing chart of FIG. 21 is characterized in that the period during which the update signal UPDATE is at H level spans from a time t41 to a time t42 within the effective pixel transfer period. As mentioned above, the timing of outputting the update signal UPDATE of H level can be changed by writing information to the register 204a of the timing signal generating circuit 204A from the CPU 215 via the CPU interface 204b. Here, although the period from the time t41 to the time t42 is an effective pixel transfer period, it is a period for transferring an analog image signal corresponding to unused effective pixels which are generated when, for example, a read original document is small in size.

In the period from the time t41 to the time t42, the correction calculating unit 2025aB performs operations the same as those performed during the time t27 to the time t28 described with reference to FIG. 18. At this point, the settling time of the DAC 2029B is from the time t41 to the time t29. Thus, since the settling time becomes longer than that of the first case above, a demand for the settling time of the DAC 2029B can be subdued compared to the first case above.

FIG. 22 shows a part of the effective pixel transfer period and the idle transfer period during the main scanning line period from the time t32 to the time t33 shown in FIG. 21. Note that the part of the effective pixel transfer period and the idle transfer period of FIG. 22 are periods the same as those of FIG. 21. Compared to the timing chart of FIG. 19, the timing chart of FIG. 22 is characterized in that the period during which the update signal UPDATE is at H level spans from a time t41a to a time t42a within the effective pixel transfer period. During the period from the time t41a to the time 42a, the correction calculating unit 2025aB performs operations the same as those performed during the time t27a to a time t28a described with reference to FIG. 19.

FIG. 23 shows a part of the effective pixel transfer period and the idle transfer period during the main scanning line period from the time t32 to the time t33 shown in FIG. 21. Note that the part of the effective pixel transfer period and the idle transfer period of FIG. 23 are periods the same as those of FIG. 21. During the part of the effective pixel transfer period and the idle transfer period of FIG. 23, operations the same as those performed during the part of the effective pixel transfer period and the idle transfer period of FIG. 22 are performed, and the digital image data are corrected.

According to the second case described above, when, for example, a read original document is small in size, the update signal UPDATE is brought to the H level during the effective pixel transfer period. Herewith, in the second case the digital offset correction may be started earlier than in the first case described above so as to shorten the idle transfer period. Furthermore, the main scanning line period is shortened by shortening the idle transfer period, which in turn shortens the time for reading the original document. In addition, when the power is turned on, in the second case the digital offset correction may be completed earlier than in the first case, and therefore, the start-up time necessary before reading of the original document can be shortened.

Figure 24:
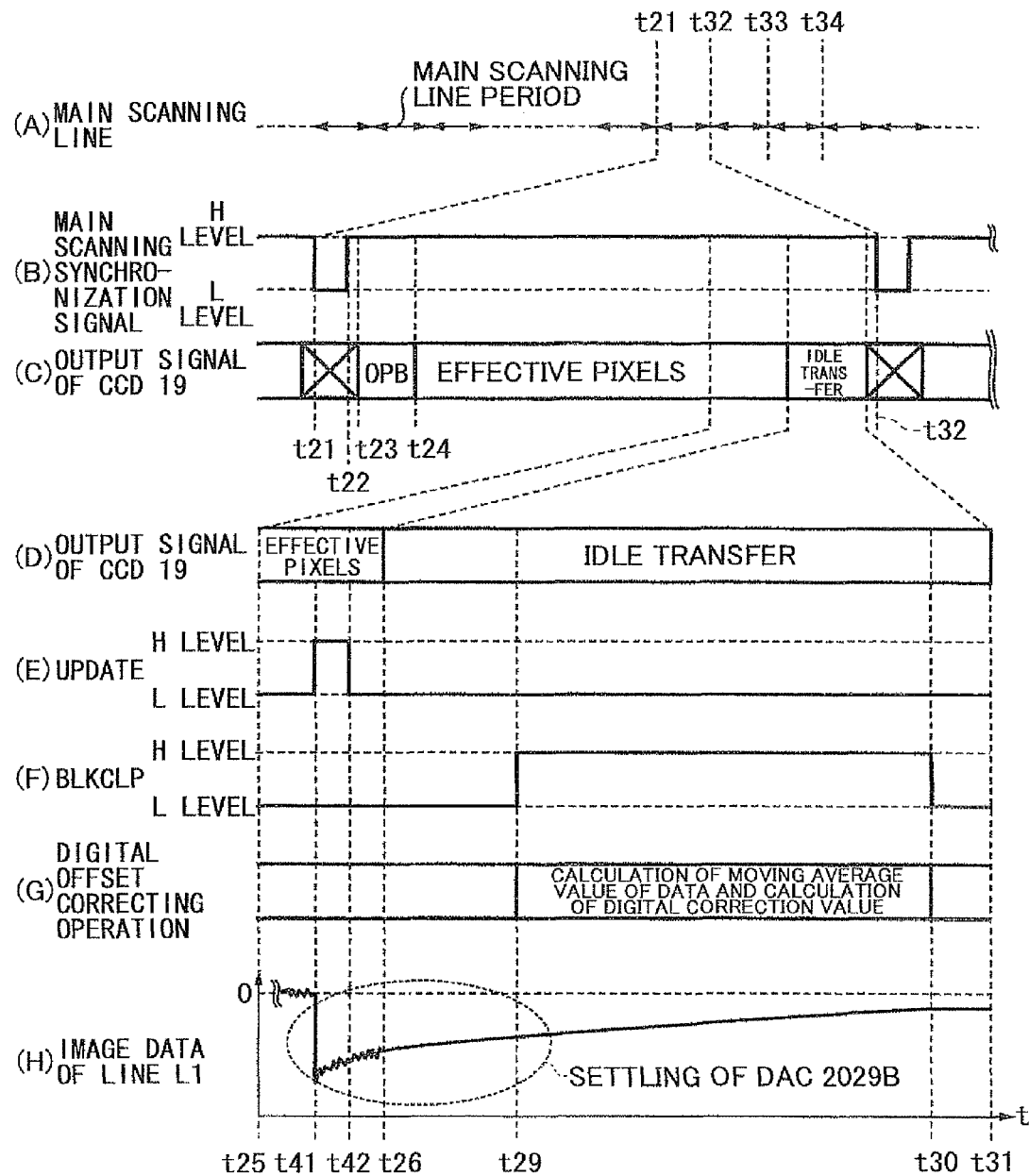
FIG. 24 is a timing chart for the digital offset correcting unit 2025B of FIG. 17 to perform digital offset correction based on the digital image data of the line L1 in the case when the voltage of the input analog image signal is abruptly changed.
Figure 25:
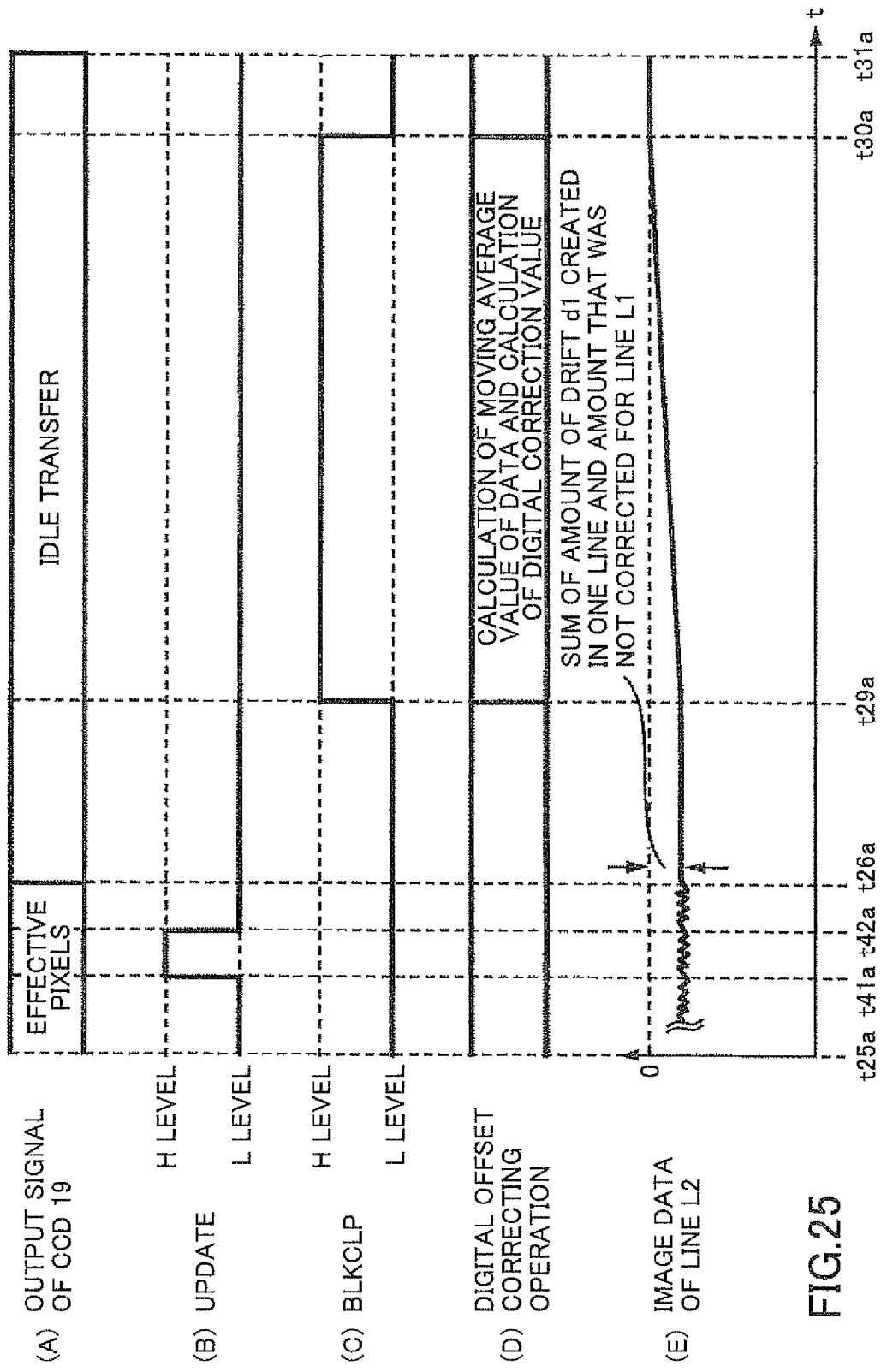
FIG. 25 is a timing chart for the digital offset correcting unit 2025B of FIG. 17 to perform digital offset correction based on the digital image data of the line L2 in the case when the voltage of the input analog image signal is abruptly changed.
Figure 26:
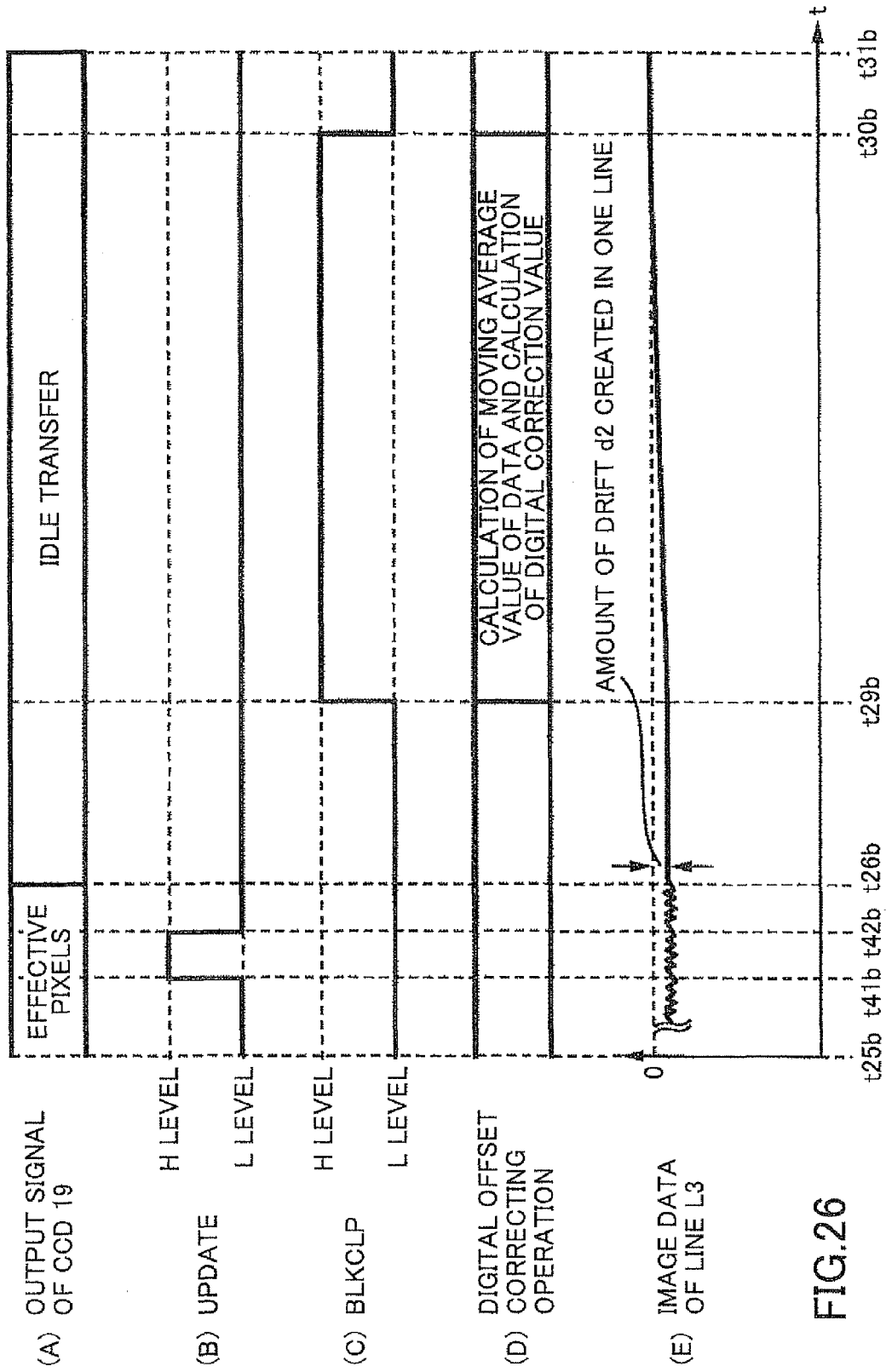
FIG. 26 is a timing chart for the digital offset correcting unit 2025B of FIG. 17 to perform digital offset correction based on the digital image data of the line L3 in the case when the voltage of the input analog image signal is abruptly changed.
Figure 27:
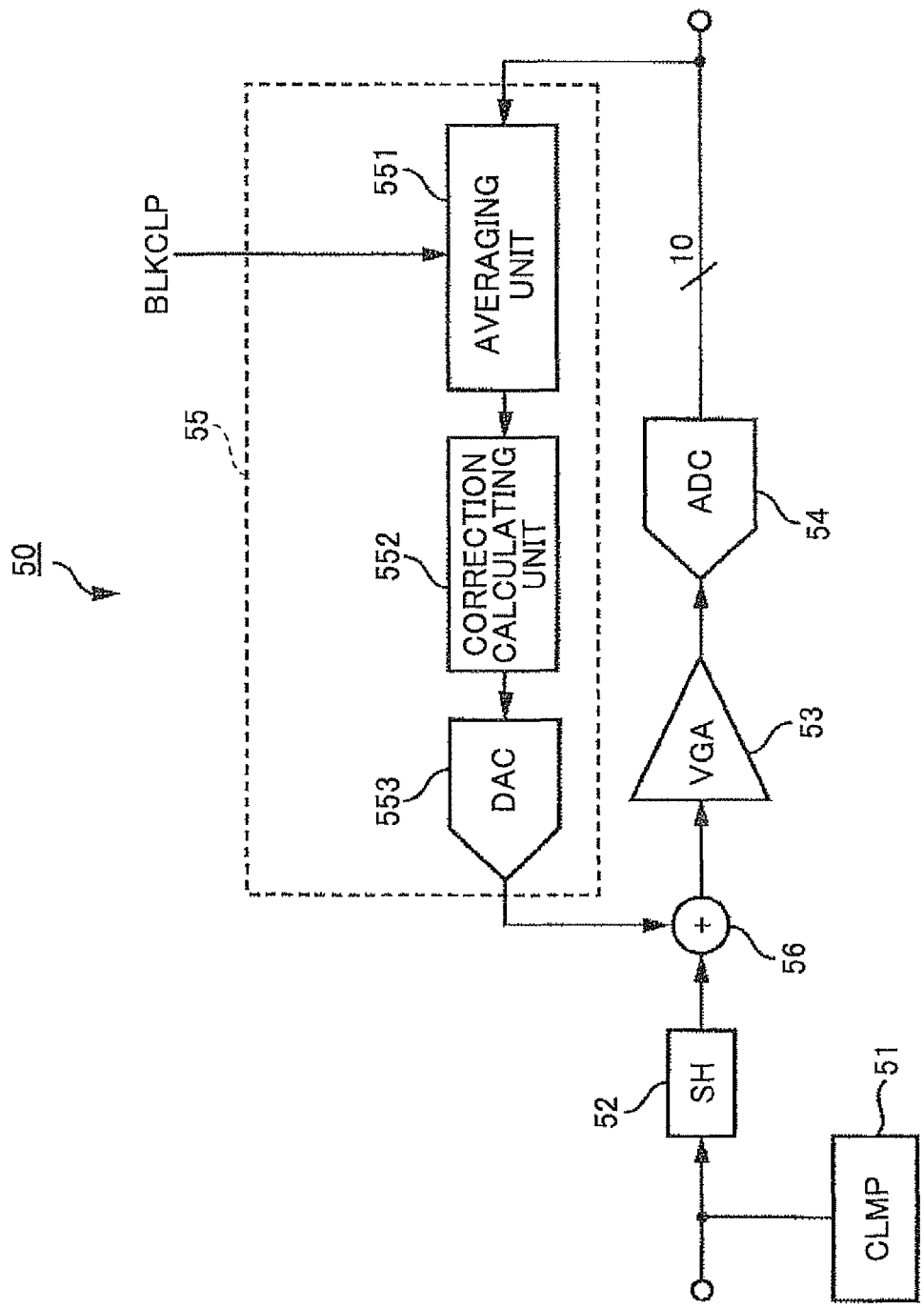
FIG. 27 is a circuit diagram showing a structure of an AFE circuit 50 used in an image processing apparatus according to a conventional technology.
Figure 28:
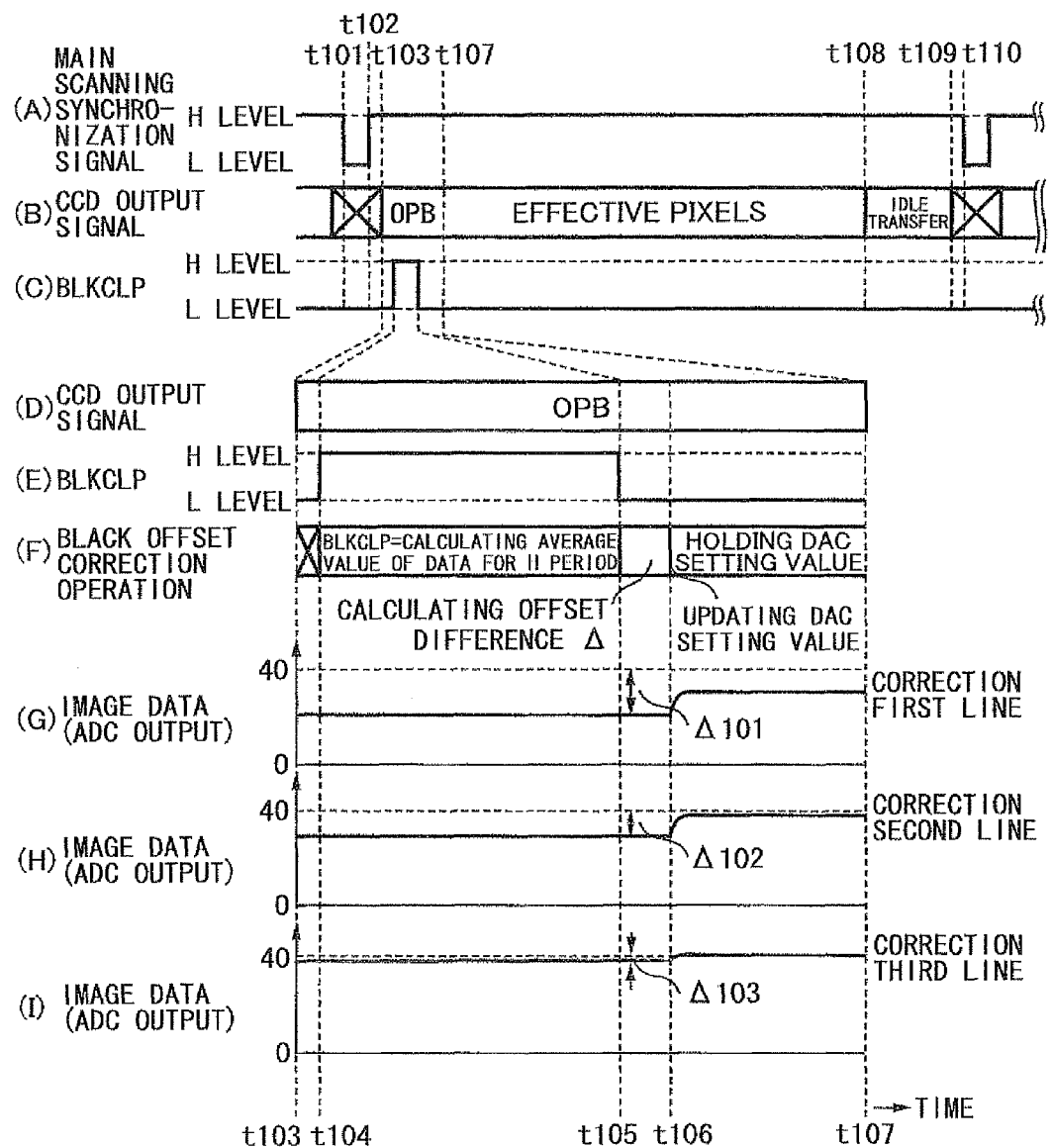
FIG. 28 is a timing chart at the time when image processing is performed in the AFE circuit 50 of FIG. 27.
Figure 29:
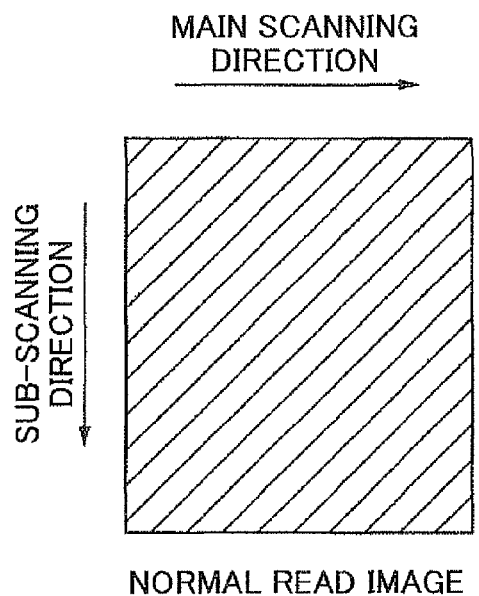
FIG. 29 shows an example of a read image in the case where there is no change in a setting code of a DAC 553 of FIG. 27 during image reading.

Next is described the third case. FIG. 24 is a timing chart for the digital offset correcting unit 2025B of FIG. 17 to perform digital offset correction based on the digital image data of the line L1 in the case when the voltage of the input analog image signal is abruptly changed. FIG. 25 is a timing chart for the digital offset correcting unit 2025B of FIG. 17 to perform digital offset correction based on the digital image data of the line L2 in the case when the voltage of the input analog image signal is abruptly changed. FIG. 26 is a timing chart for the digital offset correcting unit 2025B of FIG. 17 to perform digital offset correction based on the digital image data of the line L3 in the case when the voltage of the input analog image signal is abruptly changed. The lines L1, L2 and L3 are read by the image processing apparatus of the third embodiment in a continuous main scanning line period. Assume here that the voltage of the analog image signal is abruptly changed in the main scanning line period from the time t21 to the time t32 of FIG. 24, during which the line L1 is read.

Compared to the timing chart of FIG. 21, the timing chart of FIG. 24 is characterized in that the drop in the digital image data output from the offset adding unit 2026B is large, as shown in FIG. 24(H). Accordingly, the digital image data output to the offset adding unit 2026B is corrected to a value less than 0 only, although the filter processing unit 2025b3 and the correction calculating unit 2025aB perform digital offset correction during the period from the time t29 to the time t30.

FIG. 25 shows a part of the effective pixel transfer period and the idle transfer period during the main scanning line period from the time t32 to the time t33 shown in FIG. 24. Note that the part of the effective pixel transfer period and the idle transfer period of FIG. 25 are periods the same as those of FIG. 24. In the timing chart of FIG. 25, as shown in FIG. 25(E), a difference between the digital image data output to the offset adding unit 2026B and zero, which is the target value TG, is a sum of an amount that could not be corrected in the digital offset correction for the line L1 described with reference to FIG. 24 and the amount of drift d1 caused during the period of reading one line. As shown in FIG. 25, during the period from a time t29a to a time t30a, the filter processing unit 2025bB and the correction calculating unit 2025aB perform digital offset correction, and the digital image data output to the offset adding unit 2026B is corrected to zero.

FIG. 26 shows a part of the effective pixel transfer period and the idle transfer period during the main scanning line period from the time t33 to the time t34 shown in FIG. 24. Note that the part of the effective pixel transfer period and the idle transfer period of FIG. 26 are periods the same as those of FIG. 24. During the part of the effective pixel transfer period and the idle transfer period of FIG. 26, operations the same as those performed during the part of the effective pixel transfer period and the idle transfer period of FIG. 23 are performed, and the digital image data is corrected. In the third case above the same effect is achieved as in the second case.

As described above, according to the third embodiment of the present invention, the same effect as in the second embodiment can be achieved. In addition, since the reference voltage and current generating circuit GC1 determines the dynamic range of the input voltage of the ADC 2024B and the dynamic ranges of the output voltages of the DAC 2027aB and the DAC 2029B, even if there is individual variability (process variability) in the reference voltage and current generating circuits GC1, the variability does not affect the relationships of the dynamic ranges. Furthermore, since the update of the setting code S2 of the DAC 2029B is performed before the digital offset correction, a DNL error and a settling error of the DAC 2029B are corrected in the digital offset correction, which allows accurate adjustment of the black offset level.

Note that the first to third embodiments are described by way of examples in which the image processing apparatus of the present invention is used for an image forming apparatus, such as a copying machine; however, the image processing apparatus of the present invention may be used for other types of image forming apparatuses, such as a scanner apparatus having a scanning function and a fax machine having a facsimile function. In addition, the image processing apparatus of the present invention may be preferably used for an image forming apparatus, such as a multi-function peripheral having the above functions as well as a printer function. These image forming apparatuses are also capable of achieving the same effect described above.

According to the image processing apparatus of the present invention, after outputting the first code data to the first D/A converting unit, the digital offset correcting unit performs a low-pass filter calculation based on the digital image data output from the A/D converting unit and calculates the digital correction value based on the average value, and then performs correction on the digital image data. Accordingly, the digital offset correcting unit is able to correct a DNL error and a settling error of the first D/A converting unit, which allows accurate adjustment of the black offset level.

In addition, according to the image processing apparatus of the present invention, the reference voltage and current generating circuit sets the dynamic ranges of the output signals of the first and second D/A converting units and the dynamic range of the input signal to the A/D converting unit. Herewith, even if the reference voltage and current generating circuit has individual variability (process variability), the variability does not affect the relationships of the dynamic ranges.

Furthermore, according to the image processing apparatus of the present invention, the second conversion and addition unit digital/analog-converts predetermined second code data input thereto using the second D/A converting unit, adds the converted second code data to the analog image signal input from the amplifying unit, and outputs the resultant to the A/D converting unit. Herewith, it is possible to prevent the digital image data output from the A/D converting unit from being saturated to zero. In addition, based on the second code data, the control subtraction unit subtracts, from the digital image data output from the A/D converting unit, an additional value of the second conversion and addition unit or a value obtained by subtracting a predetermined value from the additional value, and outputs the resultant to the digital offset correcting unit. Then, the digital offset correcting unit performs correction on the digital image data so as to obtain a desired black offset level. Therefore, it is possible to prevent a density difference in an image involved with a change in the output signal of the second D/A converting unit, and also eliminate the necessity for the second D/A converting unit to have a wide dynamic range and high resolution. As a result, the chip area as well as cost can be reduced compared to the conventional technology.

Furthermore, according to the image processing apparatus of the present invention, the digital offset correcting unit compares the digital correction value to the predetermined threshold. If the digital correction value is equal to or greater than the threshold, the digital offset correcting unit reduces the digital correction value to be equal to or less than the threshold and updates the digital correction value, and then outputs, to the first conversion and addition unit, first code data corresponding to the reduced value updated as the digital correction value. The first conversion and addition unit digital/analog-converts the first code data using the first D/A converting unit, adds the converted first code data to the analog image single input from the photoelectric conversion element, and outputs the resultant to the amplifying unit. Herewith, it is possible to correct a large deviation in the black offset level without narrowing the dynamic range of the A/D converting unit.

According to the image processing method of the present invention, in the digital offset correcting step, after the first code data are output to the first D/A converting unit, a low-pass filter calculation is performed based on the digital image data output from the A/D converting unit and the digital correction value is calculated based on the average value, and correction is then performed on the digital image data. Accordingly, a DNL error and a settling error of the first D/A converting unit are corrected in the digital offset correcting step, which allows accurate adjustment of the black offset level.

In addition, according to the image processing method of the present invention, the reference voltage and current generating circuit sets the dynamic ranges of the output signals of the first and second D/A converting units and the dynamic range of the input signal to the A/D converting unit. Herewith, even if the reference voltage and current generating circuit has individual variability (process variability), the variability does not affect the relationships of the dynamic ranges.

Furthermore, according to the image processing method of the present invention, in the second conversion and addition step, input predetermined second code data are digital/analog-converted using the second D/A converting unit, then the converted second code data are added to the analog image signal input from the amplifying unit, and the resultant is output to the A/D converting unit. Herewith, it is possible to prevent the digital image data output from the A/D converting unit from being saturated to zero. In addition, in the control subtraction step, based on the second code data, the additional value obtained in the second conversion and addition step or a value obtained by subtracting a predetermined value from the additional value is subtracted from the digital image data output from the A/D converting unit, and the resultant is output to the digital offset correcting step. Then, in the digital offset correcting step, correction is performed on the digital image data so as to obtain a desired black offset level. Therefore, it is possible to prevent a density difference in an image involved with a change in the output signal of the second D/A converting unit, and also eliminate the necessity for the second D/A converting unit to have a wide dynamic range and high resolution. As a result, the chip area as well as cost can be reduced compared to the conventional technology.

Furthermore, according to the image processing method of the present invention, in the digital offset correcting step, the digital correction value is compared to the predetermined threshold. If the digital correction value is equal to or greater than the threshold, the digital correction value is reduced to be equal to or less than the threshold and then updated. In addition, the first code data corresponding to the reduced value updated as the digital correction value are output to the first conversion and addition step. In the first conversion and addition step, the first code data are digital/analog-converted using the first D/A converting unit, the converted first code data are added to the analog image signal input from the photoelectric conversion element, and the resultant is then output to the amplifying unit. Herewith, it is possible to correct a large deviation in the black offset level without narrowing the dynamic range of the A/D converting unit.

The present application is based on and claims the benefit of priority of Japanese Patent Application No. 2010-207131, filed on Sep. 15, 2010, the entire contents of which are hereby incorporated herein by reference.

The invention claimed is:

1. An image processing apparatus comprising:
an amplifying unit configured to, during a main scanning line period, amplify an analog image signal input from a photoelectric conversion element and output the amplified analog image signal;
an A/D converting unit configured to analog/digital-convert the analog image signal input from the amplifying unit to digital image data and output the digital image data; and a digital offset correcting unit configured to perform a low-pass filter calculation based on the digital image data output from the A/D converting unit to obtain an average value, calculate, based on the average value, a digital correction value used for correcting the digital image data so as to obtain a desired black offset level, and perform correction on the digital image data using the digital correction value, wherein the digital offset correcting unit compares the digital correction value to a predetermined threshold, reduces the digital correction value to be equal to or less than the threshold if the digital correction value is equal to or greater than the threshold and updates the digital correction value to the reduced value, and subsequently performs the low-pass filter calculation based on the digital image data and calculates the digital correction value.

2. The image processing apparatus as claimed in claim 1, wherein the main scanning line period includes in order an OPB pixel transfer period during which the analog image signal corresponding to effective but optically masked pixels of the photoelectric conversion element is input from the photoelectric conversion element; an effective pixel transfer period during which the analog image signal corresponding to effective pixels of the photoelectric conversion element is input from the photoelectric conversion element; and an idle transfer period during which the analog image signal corresponding to pixels other than the effective pixels of the photoelectric conversion element is input from the photoelectric conversion element.

3. The image processing apparatus as claimed in claim 2, wherein in the idle transfer period, the digital offset correcting unit compares the digital correction value to the predetermined threshold, reduces the digital correction value to be equal to or less than the threshold if the digital correction value is equal to or greater than the threshold and updates the digital correction value to the reduced value, and subsequently performs the low-pass filter calculation based on the digital image data and calculates the digital correction value.

4. The image processing apparatus as claimed in claim 2, wherein in the effective pixel transfer period, the digital offset correcting unit compares the digital correction value to the predetermined threshold, reduces the digital correction value to be equal to or less than the threshold if the digital correction value is equal to or greater than the threshold and updates the digital correction value to the reduced value, and then, in the idle transfer period, the digital offset correcting unit performs the low-pass filter calculation based on the digital image data and calculates the digital correction value.

5. An image processing method comprising:
an amplifying step of, during a main scanning line period using an amplifying unit, amplifying an analog image signal input from a photoelectric conversion element and outputting the amplified analog image signal;
an A/D converting step of analog/digital-converting the analog image signal input from the amplifying unit to digital image data and outputting the digital image data; and
a digital offset correcting step of performing a low-pass filter calculation based on the digital image data output from the A/D converting unit to obtain an average value, calculating, based on the average value, a digital correction value used for correcting the digital image data so as to obtain a desired black offset level, and performing correction on the digital image data using the digital correction value, wherein in the digital offset correcting step, the digital correction value is compared to a predetermined threshold, the digital correction value is reduced to be equal to or less than the threshold if the digital correction value is equal to or greater than the threshold and the digital correction value is updated to the reduced value, and subsequently the low-pass filter calculation is performed based on the digital image data and the digital correction value is calculated.

6. The image processing method as claimed in claim 5, wherein the main scanning line period includes in order an OPB pixel transfer period during which the analog image signal corresponding to effective but optically masked pixels of the photoelectric conversion element is input from the photoelectric conversion element; an effective pixel transfer period during which the analog image signal corresponding to effective pixels of the photoelectric conversion element is input from the photoelectric conversion element; and an idle transfer period during which the analog image signal corresponding to pixels other than the effective pixels of the photoelectric conversion element is input from the photoelectric conversion element.

7. The image processing method as claimed in claim 6, wherein in the digital offset correcting step, during the idle transfer period, the digital correction value is compared to the predetermined threshold, the digital correction value is reduced to be equal to or less than the threshold if the digital correction value is equal to or greater than the threshold and the digital correction value is updated to the reduced value, and subsequently the low-pass filter calculation is performed based on the digital image data and the digital correction value is calculated.

8. The image processing method as claimed in claim 6, wherein in the digital offset correcting step, during the effective pixel transfer period, the digital correction value is compared to the predetermined threshold, the digital correction value is reduced to be equal to or less than the threshold if the digital correction value is equal to or greater than the threshold and the digital correction value is updated to the reduced value, and subsequently the low-pass filter calculation is performed based on the digital image data and the digital correction value is calculated.

9. An integrated circuit comprising:
an amplifying unit configured to, during a main scanning line period, amplify an analog image signal input from a photoelectric conversion element and output the amplified analog image signal;
an A/D converting unit configured to analog/digital-convert the analog image signal input from the amplifying unit to digital image data and output the digital image data; and
a digital offset correcting unit configured to perform a low-pass filter calculation based on the digital image data output from the A/D converting unit to obtain an average value, calculate, based on the average value, a digital correction value used for correcting the digital image data so as to obtain a desired black offset level, and perform correction on the digital image data using the digital correction value, wherein the digital offset correcting unit compares the digital correction value to a predetermined threshold, reduces the digital correction value to be equal to or less than the threshold if the digital correction value is equal to or greater than the threshold and updates the digital correction value to the reduced value, and subsequently performs the low-pass filter calculation based on the digital image data and calculates the digital correction value.

10. The integrated circuit as claimed in claim 9, wherein the main scanning line period includes in order an OPB pixel transfer period during which the analog image signal corresponding to effective but optically masked pixels of the photoelectric conversion element is input from the photoelectric conversion element; an effective pixel transfer period during which the analog image signal corresponding to effective pixels of the photoelectric conversion element is input from the photoelectric conversion element; and an idle transfer period during which the analog image signal corresponding to pixels other than the effective pixels of the photoelectric conversion element is input from the photoelectric conversion element.

11. The integrated circuit as claimed in claim 10, wherein in the idle transfer period, the digital offset correcting unit compares the digital correction value to the predetermined threshold, reduces the digital correction value to be equal to or less than the threshold if the digital correction value is equal to or greater than the threshold and updates the digital correction value to the reduced value, and subsequently performs the low-pass filter calculation based on the digital image data and calculates the digital correction value.

12. The integrated circuit as claimed in claim 10, wherein in the effective pixel transfer period, the digital offset correcting unit compares the digital correction value to the predetermined threshold, reduces the digital correction value to be equal to or less than the threshold if the digital correction value is equal to or greater than the threshold and updates the digital correction value to the reduced value, and then, in the idle transfer period, the digital offset correcting unit performs the low-pass filter calculation based on the digital image data and calculates the digital correction value.

* * * * *